United States Patent
Bond et al.

(10) Patent No.: US 10,535,199 B1
(45) Date of Patent: Jan. 14, 2020

(54) SYSTEMS AND METHODS FOR DETERMINING A SAFETY BOUNDARY FOR A MOBILE ARTIFICIAL REALITY USER

(71) Applicant: Oculus VR, LLC, Menlo Park, CA (US)

(72) Inventors: Lars Anders Bond, San Mateo, CA (US); Niv Kantor, San Francisco, CA (US); Nadav Grossinger, Foster City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/011,621

(22) Filed: Jun. 18, 2018

(51) Int. Cl.
| | |
|---|---|
| *G06K 9/00* | (2006.01) |
| *G02B 27/01* | (2006.01) |
| *G06T 19/00* | (2011.01) |
| *G09G 5/00* | (2006.01) |
| *G06T 17/05* | (2011.01) |
| *G06F 3/0481* | (2013.01) |
| *G06F 3/01* | (2006.01) |
| *G06T 15/08* | (2011.01) |

(52) U.S. Cl.
CPC .......... *G06T 19/006* (2013.01); *G02B 27/017* (2013.01); *G06F 3/011* (2013.01); *G06F 3/04815* (2013.01); *G06K 9/00671* (2013.01); *G06T 15/08* (2013.01); *G06T 17/05* (2013.01); *G06T 2207/10028* (2013.01)

(58) Field of Classification Search
CPC ....................................................... G06T 19/006
USPC .......................................................... 345/633
See application file for complete search history.

(56) References Cited

U.S. PATENT DOCUMENTS

| | | | |
|---|---|---|---|
| 9,101,279 B2* | 8/2015 | Ritchey | G16H 40/63 |
| 2007/0195012 A1* | 8/2007 | Ichikawa | G02B 27/017 345/8 |
| 2009/0070404 A1* | 3/2009 | Mazzaferri | G06F 9/542 709/202 |
| 2009/0112683 A1* | 4/2009 | Hamilton, II | G06Q 30/02 705/7.32 |
| 2012/0287123 A1* | 11/2012 | Starner | G06F 1/163 345/419 |
| 2013/0084970 A1* | 4/2013 | Geisner | A63F 13/216 463/29 |
| 2013/0307856 A1* | 11/2013 | Keane | G10L 21/10 345/473 |
| 2014/0002496 A1* | 1/2014 | Lamb | G06F 3/14 345/633 |

(Continued)

*Primary Examiner* — Javid A Amini
(74) *Attorney, Agent, or Firm* — FisherBroyles, LLP

(57) ABSTRACT

The disclosed method may include (1) sensing, via a depth-sensing subsystem, a plurality of locations in three-dimensional space corresponding to physical surfaces in a real-world environment, (2) determining a dominant plane within the real-world environment, (3) defining a three-dimensional grid that is aligned with the dominant plane, (4) identifying, based on the plurality of locations relative to the dominant plane, a set of grid coordinates within the three-dimensional grid that are indicative of the physical surfaces, and (5) determining, based on the set of grid coordinates, a safety boundary to be employed by a head-mounted display system to notify a user of the head-mounted display system of the user's proximity to the physical surfaces. Various other methods, systems, and computer-readable media are also disclosed.

17 Claims, 15 Drawing Sheets

(56) References Cited

U.S. PATENT DOCUMENTS

| | | | |
|---|---|---|---|
| 2015/0276422 A1* | 10/2015 | Bouve | G08G 1/096775 |
| | | | 701/538 |
| 2016/0210602 A1* | 7/2016 | Siddique | G06Q 20/0453 |
| 2016/0342840 A1* | 11/2016 | Mullins | G06K 9/00671 |
| 2017/0011423 A1* | 1/2017 | Douglas | G06Q 30/0261 |
| 2017/0177941 A1* | 6/2017 | Mullins | G06K 9/00671 |
| 2017/0185148 A1* | 6/2017 | Kondo | G06F 3/011 |
| 2017/0193302 A1* | 7/2017 | Mullins | G02B 27/017 |
| 2017/0205892 A1* | 7/2017 | Petrovskaya | G06T 19/006 |
| 2017/0208533 A1* | 7/2017 | Stracener | H04W 48/04 |
| 2017/0277260 A1* | 9/2017 | Tamaoki | G02B 27/0093 |
| 2017/0353942 A1* | 12/2017 | Stojanovski | H04W 4/90 |
| 2018/0015368 A1* | 1/2018 | Katagai | A63F 13/814 |
| 2018/0373412 A1* | 12/2018 | Reif | G06F 3/04815 |

\* cited by examiner

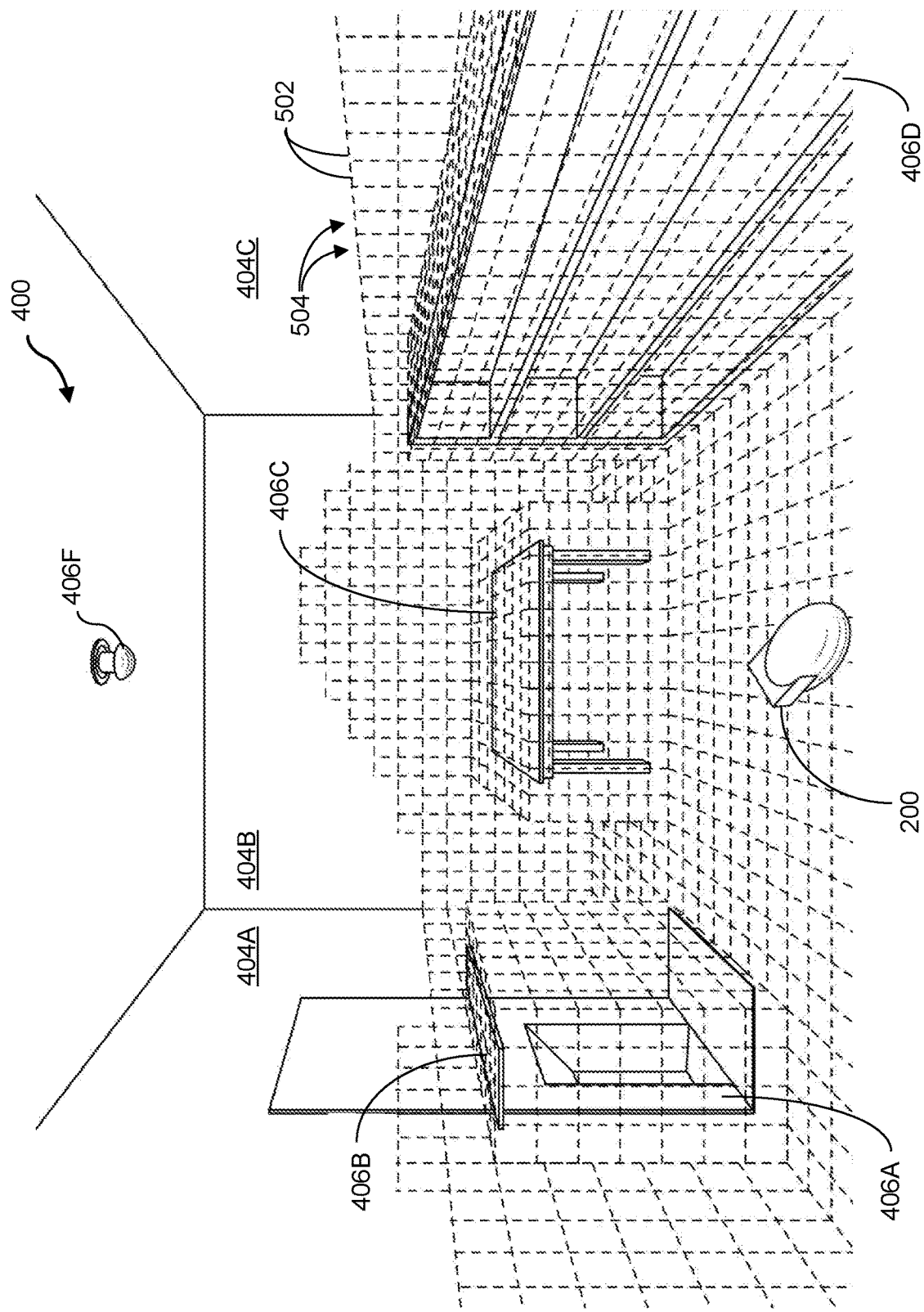

SYSTEMS AND METHODS FOR DETERMINING A SAFETY BOUNDARY FOR A MOBILE ARTIFICIAL REALITY USER

BACKGROUND

Artificial reality systems (e.g., virtual reality (VR) systems, augmented reality (AR) systems, and the like) may enable users to engage in more immersive experiences than those that may be provided by ordinary television or video gaming. While wearing a VR or AR device (e.g., a head-mounted display (HMD)), a user may view different portions of a virtual scene (e.g., a scene that is captured or artificially generated) simply by reorienting his or her head, just as the user may do within a real-world environment. The virtual scene may be presented in the HMD to the user based on the position and orientation of the user's head, such that the scene is altered based on changes in the position and/or orientation of the user's head. A mobile VR system may also account for the movement of the user as the user walks about within the real-world environment such that the user perceives himself or herself to be moving within a virtual environment.

In some cases, these features may permit the user to engage with the environment in a way that causes the user to forget important aspects of the user's real-world environment. For example, a user attempting to walk from one position to another within the virtual environment may fail to account for, or be unable to see, a real-world obstacle (e.g., a table, a couch, or a wall) due to the user's lack of awareness of the real-world environment. Such circumstances may result in the user colliding with, or otherwise making unwanted contact with, the obstacle.

SUMMARY

As will be described in greater detail below, the instant disclosure describes systems and methods for determining a safety boundary for a mobile artificial reality user. In one example, a method for determining such a boundary may include (1) sensing, via a depth-sensing subsystem, a plurality of locations in three-dimensional space corresponding to physical surfaces in a real-world environment, (2) determining a dominant plane within the real-world environment, (3) defining a three-dimensional grid that is aligned with the dominant plane, (4) identifying, based on the plurality of locations relative to the dominant plane, a set of grid coordinates within the three-dimensional grid that are indicative of the physical surfaces, and (5) determining, based on the set of grid coordinates, a safety boundary to be employed by a head-mounted display system to notify a user of the head-mounted display system of the user's proximity to the physical surfaces. In some embodiments, the dominant plane may include a horizontal plane dividing the real-world environment into an upper region and a lower region. In some examples, the dominant plane may be located higher than a height of the user.

In some embodiments, the method may further include defining, based on the set of grid coordinates, vertical columns of volumetric elements aligned with the three-dimensional grid to indicate the physical surfaces, where the safety boundary is based on the vertical columns of volumetric elements. Further, in some examples, (1) sensing the plurality of locations may include sensing a first location, and (2) identifying the set of grid coordinates may include (a) defining a first volumetric element at the first location, and (b) defining one of more additional first volumetric elements contiguously with the first volumetric element to form a first vertical column of volumetric elements. In such examples, the one or more additional first volumetric elements may extend vertically from the first volumetric element in a first direction away from the dominant plane. Moreover, (1) sensing the plurality of locations may include sensing a second location of the plurality of locations positioned vertically between the first volumetric element and the dominant plane, and (2) identifying the set of grid coordinates may include (a) translating the first volumetric element vertically to the second location, and (b) translating the one or more additional first volumetric elements vertically to maintain the first vertical column. In some embodiments, (1) sensing the plurality of locations may include sensing a second location of the plurality of locations positioned vertically from, and opposite the dominant plane from, the first location, (2) identifying the set of grid coordinates may include (a) defining a second volumetric element at the second location, and (b) defining one or more additional second volumetric elements contiguously with the second volumetric element to form a second vertical column of volumetric elements, and (3) the one or more additional second volumetric elements may extend vertically from the second volumetric element in a second direction away from the dominant plane, opposite the first direction. In some examples, identifying the set of grid coordinates may also include (1) determining a distance between the first volumetric element and the second volumetric element, and (2) defining, based on the distance between the first volumetric element and the second volumetric element being less than a threshold value, one or more third volumetric elements between the first volumetric element and the second volumetric element to form a vertical column comprising the first vertical column, the second vertical column, and the third volumetric elements.

In some embodiments, (1) sensing the plurality of locations may include sensing at least one vertical surface in the real-world environment, and (2) defining the three-dimensional grid may include aligning the three-dimensional grid based on an orientation of the vertical surface. In such embodiments, the vertical surface may include a wall.

In some examples, the head-mounted display system may include the depth-sensing system.

In some embodiments, (1) sensing the plurality of locations may include sensing a horizontal surface, and (2) determining the dominant plane may include defining the dominant plane as parallel to the horizontal surface. In such embodiments, the horizontal surface may include at least one of a ceiling or a floor.

In various examples, (1) sensing the plurality of locations may include sensing a vertical surface, and (2) determining the dominant plane may include defining the dominant plane as orthogonal to the vertical surface. In such examples, the vertical surface may include a wall.

In some embodiments, the method may further include sensing, via an inertial measurement unit, a horizontal plane, where determining the dominant plane includes defining the dominant plane as parallel to the horizontal plane.

In some examples, at least a portion of the above-described method may be encoded as computer-readable instructions on a computer-readable medium. For example, a non-transitory, tangible computer-readable storage medium may have instructions stored thereon that, when executed by a processing system, cause the processing system to perform operations including (1) receiving, from a depth-sensing subsystem, data indicating a plurality of locations in three-dimensional space corresponding to physical surfaces in a real-world environment, (2) determining a dominant plane within the real-world environment, (3) defining a three-dimensional grid that is aligned with the dominant plane, (4) identifying, based on the plurality of locations relative to the dominant plane, a set of grid coordinates within the three-dimensional grid that are indicative of the physical surfaces, and (5) determining, based on the set of grid coordinates, a safety boundary to be employed by a head-mounted display system to notify a user of the head-mounted display system of the user's proximity to the physical surfaces. In some embodiments, (1) identifying the set of grid coordinates may include defining, based on the set of grid coordinates, vertical columns of volumetric elements aligned with the three-dimensional grid to indicate the physical surfaces, and (2) the safety boundary may be based on the vertical columns of volumetric elements.

In one example, a head-mounted display system may include (1) a display device dimensioned to be secured to a head of a user in a manner that at least partially obscures visibility of a real-world environment to the user, (2) a depth-sensing subsystem that senses a plurality of locations in three-dimensional space corresponding to physical surfaces in the real-world environment, and (3) a processing system that (a) determines a dominant plane within the real-world environment, (b) defines a three-dimensional grid that is aligned with the dominant plane, (c) identifies, based on the plurality of locations relative to the dominant plane, a set of grid coordinates within the three-dimensional grid that are indicative of the physical surfaces, (d) determines, based on the set of grid coordinates, a safety boundary associated with the physical surfaces, and (e) presents, to the user based on the safety boundary, an indication of the user's proximity to the physical surfaces.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 5A and 5B are perspective views of a user wearing the HMD device of FIG. 2 to generate an exemplary model of the real-world environment of FIGS. 4A, 4B, and 4C.

Figure 1:
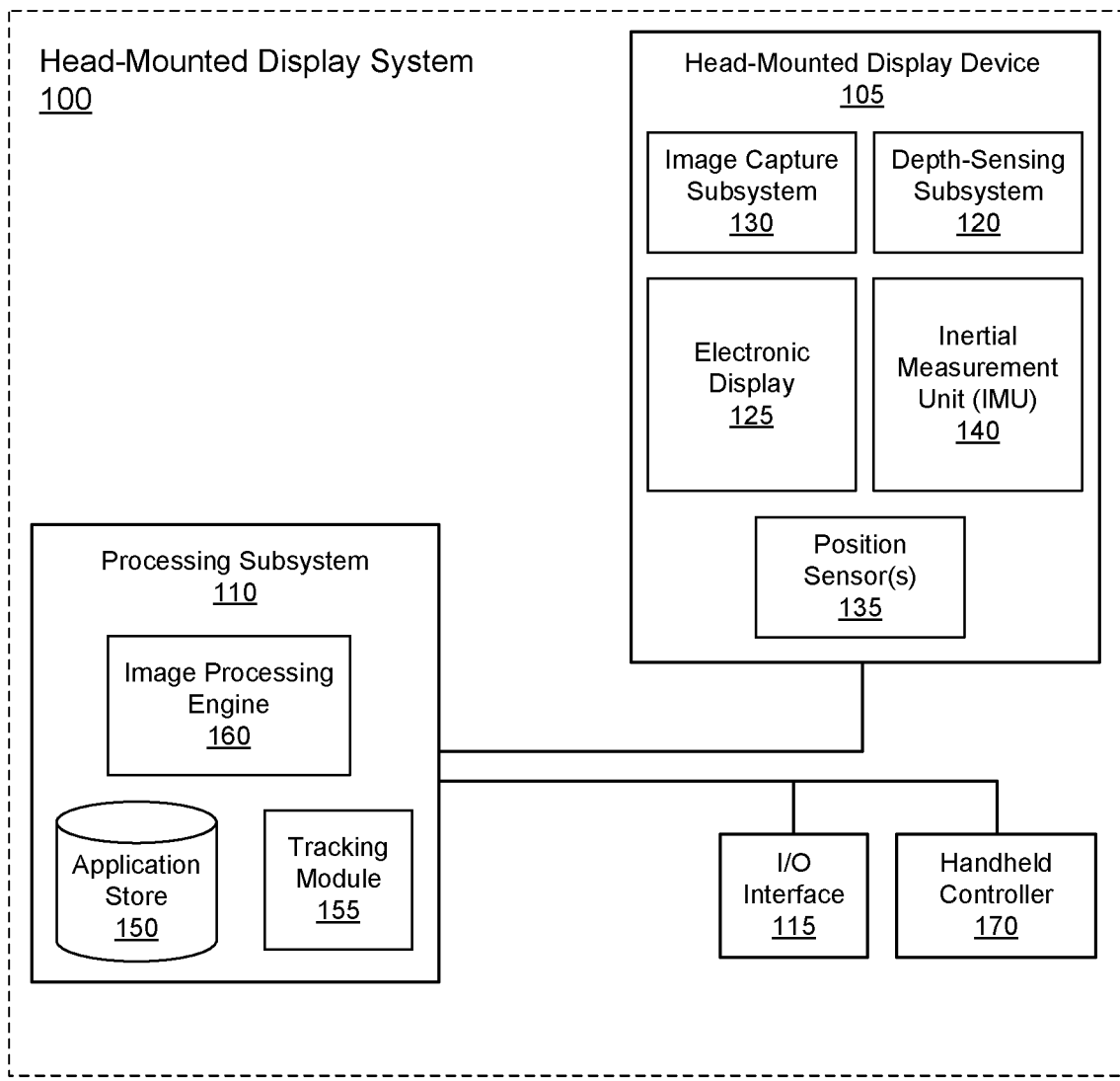
FIG. 1 is a block diagram of an exemplary head-mounted display (HMD) system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to determining a safety boundary for a mobile artificial reality user (e.g., a user of an HMD device of a VR system). Because an HMD device may partially or completely obstruct the user's view of the real-world environment, the user may be able to see only a portion of his or her surroundings at most, and many HMD devices may entirely obstruct the user's view. Accordingly, as will be explained in greater detail below, embodiments of the instant disclosure may facilitate an efficient generation of a model (e.g., a volumetric model), aligned with a three-dimensional grid, that represents an HMD device user's real-world surroundings or environment. The safety boundary may be based on that model and may be employed to warn the user of a potential physical encounter with an object in the real-world environment.

As part of a training phase, in some embodiments, the user may first be prompted to visualize the real-world environment with the HMD device, which can generate a model of that environment. During an interaction or operational phase, the user may interact with a virtual environment, such that the movement of a user from one location to another in the virtual environment is accomplished by the user moving (e.g., walking around) within the real-world environment. For example, the user may walk from one part of his or her living room to another to "move" within the virtual environment being presented in a display of the HMD device the user is wearing. To provide the user with awareness of the real-world environment during the interaction phase, a portion of the model generated during the training phase may be shown to the user in a display along with the virtual scene or environment when the user moves too close to a physical object or surface of the real-world environment.

To simplify the use of a VR system that includes such a safety feature, the model may be stored in a memory device for use in future VR sessions. For example, the first time the HMD device is used in a particular room, the system may prompt the user to scan or fully view the real-world environment with the HMD device as part of a training phase. The system may generate the model and then save the model in a memory device. Thereafter, prior to a subsequent use of the HMD device in the same room, the HMD device may obtain information from the room that can be used as an identifier of that room. The system may use the identifying information to query a database to determine whether a previously saved model is included in memory. If a matching model is found, the model may be loaded for the user by the VR system without requiring a new model to be produced every time the HMD device is to be used.

The following will provide, with reference to FIGS. 1-9, detailed descriptions of systems and methods for determining a safety boundary for a mobile artificial reality user. More specifically, a description of an exemplary HMD system is presented in reference to FIG. 1. Additionally, discussions regarding an exemplary HMD device and an associated handheld controller are provided in conjunction with FIGS. 2 and 3, respectively. An exemplary real-world environment (e.g., a room) within which the various systems and methods may be employed is presented in reference to the various views of FIGS. 4A, 4B, and 4C. In association with FIGS. 5A, 5B, 6A, 6B, and 6C, the generation of an exemplary three-dimensional grid-aligned model associated with the real-world environment is described. Use of an exemplary safety boundary associated with the model is presented in conjunction with FIGS. 7A and 7B. An exemplary method of determining a safety boundary is discussed in reference to FIG. 8. Further, in association with FIG. 9, use of an exemplary memory device including information for storing such models and associated safety boundaries is described.

FIG. 1 is a block diagram of an exemplary HMD system 100 (e.g., a type of mobile artificial reality system) that may present virtual scenes (e.g., captured scenes, artificially-generated scenes, or a combination thereof) to a user. HMD system 100 may operate in a virtual reality (VR) system environment, an augmented reality (AR) system environment, a mixed reality (MR) system environment, or some combination thereof. HMD system 100 shown in FIG. 1 may include an HMD device 105 that includes or communicates with a processing subsystem 110 and an input/output (I/O) interface 115. HMD device 105 may completely obstruct the user's view of the real-world environment, in some embodiments. Other embodiments may only partially obstruct the user's view of the real-world environment and/or may obstruct the user's view depending on content being displayed in a display of HMD device 105.

While FIG. 1 shows an exemplary HMD system 100 that includes at least one HMD device 105 and at least one I/O interface 115, in other embodiments any number of these components may be included in HMD system 100. For example, HMD system 100 may include multiple HMD devices 105, each having an associated I/O interface 115, with each HMD device 105 and I/O interface 115 communicating with processing subsystem 110. In embodiments in which processing subsystem 110 is not included within, or otherwise integrated with, HMD device 105, HMD device 105 may communicate with processing subsystem 110 over a wired connection or a wireless connection. In alternative configurations, different and/or additional components may be included in HMD system 100. Additionally, functionality described in connection with one or more of the components shown in FIG. 1 may be distributed among the components in a different manner than that described with respect to FIG. 1, in some embodiments.

Figure 2:
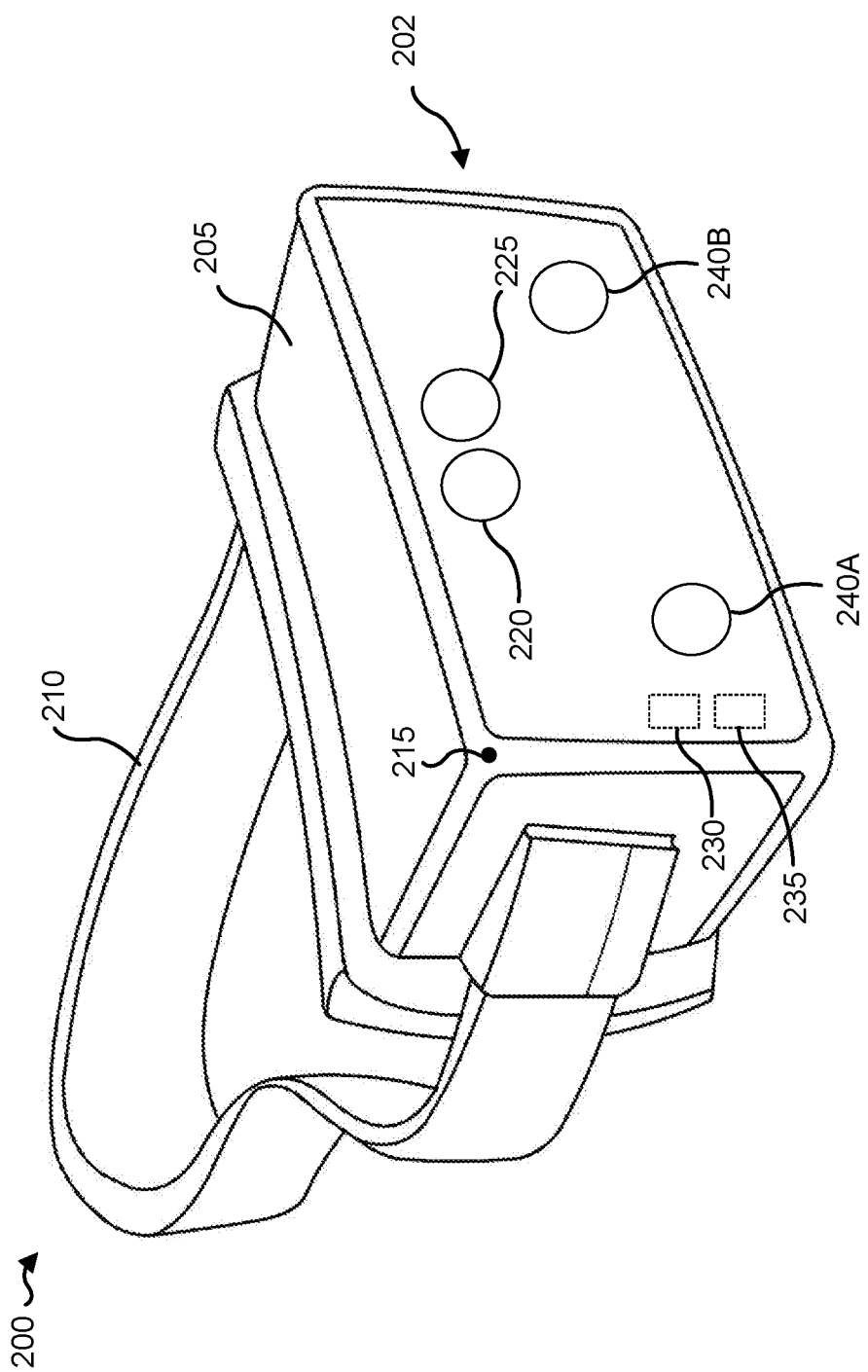
FIG. 2 is a perspective view of an exemplary HMD device that may be included in the HMD system of FIG. 1.

HMD device 105 may present a variety of content to a user, including virtual views of an artificially rendered virtual-world environment and/or augmented views of a physical, real-world environment. Augmented views may be augmented with computer-generated elements (e.g., two-dimensional (2D) or three-dimensional (3D) images, 2D or 3D video, sound, etc.). In some embodiments, the presented content may include audio that is provided via an internal or external device (e.g., speakers and/or headphones) that receives audio information from HMD device 105, processing subsystem 110, or both, and presents audio data based on the audio information. In some embodiments, the speakers and/or headphones may be integrated into, or releasably coupled or attached to, HMD device 105. HMD device 105 may include one or more bodies, which may be rigidly or non-rigidly coupled together. A rigid coupling between rigid bodies may cause the coupled rigid bodies to act as a single rigid entity. In contrast, a non-rigid coupling between rigid bodies may allow the rigid bodies to move relative to each other. A particular embodiment of HMD device 105 is an HMD device 200 that is shown in FIG. 2 and described in further detail below.

In some examples, HMD device 105 may include a depth-sensing subsystem 120 (e.g., a depth camera subsystem), an electronic display 125, an image capture subsystem 130 that includes one or more cameras, one or more position sensors 135, and/or an inertial measurement unit (IMU) 140. One or more of these components may provide a positioning subsystem of HMD device 105 that can determine the position of HMD device 105 relative to a real-world environment and individual features contained therein. Other embodiments of HMD device 105 may include an optional eye-tracking or gaze-estimation system configured to track the eyes of a user of HMD device 105 to estimate the user's gaze. Some embodiments of HMD device 105 may have different components than those described in conjunction with FIG. 1.

Depth-sensing subsystem 120 may capture data describing depth information characterizing a local real-world area or environment surrounding some or all of HMD device 105. In some embodiments, depth-sensing subsystem 120 may characterize a position and/or velocity of depth-sensing subsystem 120 (and thereby of HMD device 105) within the local area. Depth-sensing subsystem 120, in some examples, may compute a depth map using collected data (e.g., based on captured light according to one or more computer-vision schemes or algorithms, by processing a portion of a structured light pattern, by time-of-flight (ToF) imaging, simultaneous localization and mapping (SLAM), etc.), or depth-sensing subsystem 120 can transmit this data to another device, such as an external implementation of processing subsystem 110, that may generate a depth map using the data from depth-sensing subsystem 120. As described herein, the depth maps may be used to generate a model of the environment surrounding HMD device 105. Accordingly, depth-sensing subsystem 120 may be referred to as a localization and modeling subsystem or may be a part of such a subsystem.

Electronic display 125 may display two-dimensional or three-dimensional images to the user in accordance with data received from processing subsystem 110. In various embodiments, electronic display 125 may include a single electronic display or multiple electronic displays (e.g., a display for each eye of the user). Examples of electronic display 125 may include, but are not limited to, a liquid crystal display (LCD), an organic light-emitting diode (OLED) display, an inorganic light-emitting diode (ILED) display, an active-matrix organic light-emitting diode (AMOLED) display, a transparent organic light-emitting diode (TOLED) display, another suitable display, or some combination thereof. Electronic display 125 may be opaque such that the user cannot see the local environment through electronic display 125. When the user cannot see his or her local environment, the user may lose track of potential hazards in that environment.

Image capture subsystem 130 may include one or more optical image sensors or cameras that capture and collect image data from the local environment. In some embodiments, the sensors included in image capture subsystem 130 may provide stereoscopic views of the local environment that may be used by processing subsystem 110 to generate image data that characterizes the local environment and/or a position and orientation of HMD device 105 within the local environment. In some embodiments, the image data may be processed by processing subsystem 110 or another component of image capture subsystem 130 to generate a three-dimensional view of the local environment. For example, image capture subsystem 130 may include simultaneous localization and mapping (SLAM) cameras or other cameras that include a wide-angle lens system that captures a wider field-of-view than may be captured by the eyes of the user.

In some embodiments, processing subsystem 110 may process the images captured by image capture subsystem 130 to extract various aspects of the visual appearance of the local real-world environment. For example, image capture subsystem 130 may capture color images of the real-world environment that provide information regarding the visual appearance of various features within the real-world environment. Image capture subsystem 130 may capture the color, patterns, etc. of the walls, the floor, the ceiling, paintings, pictures, fabric textures, etc., in the room. These visual aspects may be encoded and stored in a database. Processing subsystem 110 may associate these aspects of visual appearance with specific portions of the model of the real-world environment so that the model can be rendered with the same or similar visual appearance at a later time.

IMU 140, in some examples, may represent an electronic subsystem that generates data indicating a position and/or orientation of HMD device 105 based on measurement signals received from one or more of position sensors 135 and/or from depth information received from depth-sensing subsystem 120 and/or image capture subsystem 130. For example, position sensors 135 may generate one or more measurement signals in response to the motion of HMD device 105. Examples of position sensors 135 include one or more accelerometers, one or more gyroscopes, one or more magnetometers, another suitable type of sensor that detects motion, a type of sensor used for error correction of IMU 140, or some combination thereof. Position sensors 135 may be located external to IMU 140, internal to IMU 140, or some combination thereof.

Based on the one or more measurement signals from one or more of position sensors 135, IMU 140 may generate data indicating an estimated current position, elevation, and/or orientation of HMD device 105 relative to an initial position and/or orientation of HMD device 105. This information may be used to generate a personal zone that can be used as a proxy for the user's position within the local environment. For example, position sensors 135 may include multiple accelerometers to measure translational motion (forward/back, up/down, left/right) and multiple gyroscopes to measure rotational motion (e.g., pitch, yaw, roll). As described herein, image capture subsystem 130 and/or depth-sensing subsystem 120 may generate data indicating an estimated current position and/or orientation of HMD device 105 relative to the real-world environment in which HMD device 105 is used.

I/O interface 115 may represent a subsystem or device that allows a user to send action requests and receive responses from processing subsystem 110 and/or a hand-secured or handheld controller 170. In some embodiments, I/O interface 115 may facilitate communication with more than one handheld controller 170. For example, the user may have two handheld controllers 170, with one in each hand. An action request may, in some examples, represent a request to perform a particular action. For example, an action request may be an instruction to start or end the capture of image or video data, an instruction to perform a particular action within an application, or an instruction to start or end a boundary definition state. I/O interface 115 may include one or more input devices or may enable communication with one or more input devices. Exemplary input devices may include, but are not limited to, a keyboard, a mouse, a handheld controller (which may include a glove or a bracelet), or any other suitable device for receiving action requests and communicating the action requests to processing subsystem 110.

An action request received by I/O interface 115 may be communicated to processing subsystem 110, which may perform an action corresponding to the action request. In some embodiments, handheld controller 170 may include a separate IMU 140 that captures inertial data indicating an estimated position of handheld controller 170 relative to an initial position. In some embodiments, I/O interface 115 and/or handheld controller 170 may provide haptic feedback to the user in accordance with instructions received from processing subsystem 110 and/or HMD device 105. For example, haptic feedback may be provided when an action request is received or when processing subsystem 110 communicates instructions to I/O interface 115, which may cause handheld controller 170 to generate or direct generation of haptic feedback when processing subsystem 110 performs an action.

Processing subsystem 110 may include one or more processing devices or physical processors that provide content to HMD device 105 in accordance with information received from one or more of depth-sensing subsystem 120, image capture subsystem 130, IMU 140, I/O interface 115, and/or handheld controller 170. In the example shown in FIG. 1, processing subsystem 110 may include an image processing engine 160, an application store 150, and a tracking module 155. Some embodiments of processing subsystem 110 may have different modules or components than those described in conjunction with FIG. 1. Similarly, the functions further described herein may be distributed among the components of HMD system 100 in a different manner than described in conjunction with FIG. 1.

Application store 150 may store one or more applications for execution by processing subsystem 110. An application may, in some examples, represent a group of instructions that, when executed by a processor, generates content for presentation to the user. Such content may be generated in response to inputs received from the user via movement of HMD device 105 and/or handheld controller 170. Examples of such applications may include gaming applications, conferencing applications, video playback applications, social media applications, and/or any other suitable applications.

Tracking module 155 may calibrate HMD system 100 using one or more calibration parameters and may adjust one or more of the calibration parameters to reduce error when determining the position of HMD device 105 and/or handheld controller 170. For example, tracking module 155 may communicate a calibration parameter to depth-sensing subsystem 120 to adjust the focus of depth-sensing subsystem 120 to more accurately determine positions of structured light elements captured by depth-sensing subsystem 120.

Calibration performed by tracking module 155 may also account for information received from IMU 140 in HMD device 105 and/or another IMU 140 included in handheld controller 170. Additionally, if tracking of HMD device 105 is lost or compromised (e.g., if depth-sensing subsystem 120 loses line-of-sight of at least a threshold number of structured light elements), tracking module 155 may recalibrate some or all of HMD system 100.

Tracking module 155 may track movements of HMD device 105 and/or handheld controller 170 using information from depth-sensing subsystem 120, image capture subsystem 130, the one or more position sensors 135, IMU 140, or some combination thereof. For example, tracking module 155 may determine a position of a reference point of HMD device 105 in a mapping of the real-world environment based on information collected with HMD device 105. Additionally, in some embodiments, tracking module 155 may use portions of data indicating a position and/or orientation of HMD device 105 and/or handheld controller 170 from IMU 140 to predict a future position and/or orientation of HMD device 105 and/or handheld controller 170. Tracking module 155 may also provide the estimated or predicted future position of HMD device 105 and/or I/O interface 115 to image processing engine 160.

In some embodiments, tracking module 155 may track other features that can be observed by depth-sensing subsystem 120, image capture subsystem 130, and/or another system. For example, tracking module 155 may track one or both of the user's hands so that the location of the user's hands within the real-world environment may be known and utilized. To simplify the tracking of the user within the real-world environment, tracking module 155 may generate and/or use a proxy for the user. The proxy can define a personal zone associated with the user, which may provide an estimate of the volume occupied by the user. Tracking module 155 may monitor the user's position in relation to various features of the environment by monitoring the user's proxy or personal zone in relation to the environment. Tracking module 155 may also receive information from one or more eye-tracking cameras included in some embodiments of HMD device 105 to track the user's gaze.

Image processing engine 160 may generate a three-dimensional mapping of the area surrounding some or all of HMD device 105 (i.e., the "local area" or "real-world environment") based on information received from HMD device 105. In some embodiments, image processing engine 160 may determine depth information for the three-dimensional mapping of the local area based on information received from depth-sensing subsystem 120 that is relevant for techniques used in computing depth. Image processing engine 160 may calculate depth information using one or more techniques in computing depth from structured light. In various embodiments, image processing engine 160 may use the depth information, e.g., to generate and/or update a model of the local area and generate content based in part on the updated model. Image processing engine 160 may also extract aspects of the visual appearance of a scene so that a model of the scene may be more accurately rendered at a later time, as described herein.

Image processing engine 160 may also execute applications within HMD system 100 and receive position information, acceleration information, velocity information, predicted future positions, or some combination thereof, of HMD device 105 from tracking module 155. Based on the received information, image processing engine 160 may identify content to provide to HMD device 105 for presentation to the user. For example, if the received information indicates that the user has looked to the left, image processing engine 160 may generate content for HMD device 105 that corresponds to the user's movement in a virtual environment or in an environment augmenting the local area with additional content. To provide the user with awareness of his or her surroundings, image processing engine 160 may present a combination of the virtual environment and the model of the real-world environment as is described herein in further detail. Additionally, image processing engine 160 may perform an action within an application executing on processing subsystem 110 in response to an action request received from I/O interface 115 and/or handheld controller 170 and provide visual, audible, and/or haptic feedback to the user that the action was performed.

FIG. 2 is a diagram of an HMD device 200, in accordance with one embodiment of HMD device 105. HMD device 200 may include an imaging subsystem and a depth-sensing subsystem. In some embodiments, the imaging subsystem and the depth-sensing subsystem may be provided by a single set of sensors providing data that can be processed for imaging purposes and for depth mapping purposes. HMD device 200 may be part of, e.g., a VR system, an AR system, an MR system, and/or some combination thereof. In embodiments that describe an AR system and/or an MR system, portions of a front side 202 of HMD device 200 may be at least partially transparent in the visible band (e.g., about 380 nanometers (nm) to 750 nm). More specifically, portions of HMD device 200 that are between front side 202 of HMD device 200 and an eye of the user may be at least partially transparent (e.g., a partially-transparent electronic display 125). In other embodiments, front side 202 may be opaque, preventing the user from seeing the real-world environment and any potential collision risks therein. HMD device 200 may include a front rigid body 205 housing electronic display 125 and other components, a user attachment system such as a band 210 that secures HMD device 200 to a user's head, and a reference point 215 that can be used to characterize a position and/or orientation of HMD device 200.

HMD device 200 may include an imaging aperture 220 and an illumination aperture 225. An illumination source included in depth-sensing subsystem 120 may emit light (e.g., structured light) through illumination aperture 225. An imaging device of depth-sensing subsystem 120 may capture light from the illumination source that is reflected or back-scattered from the local area through imaging aperture 220. Embodiments of HMD device 200 may further include cameras 240A and 240B that may be components of image capture subsystem 130 of FIG. 1.

Front rigid body 205 may include one or more electronic display elements, one or more integrated eye-tracking systems, an IMU 230, one or more position sensors 235, and reference point 215. IMU 230 may represent an electronic device that generates fast calibration data based on measurement signals received from one or more of position sensors 235. Position sensors 235 may generate one or more measurement signals in response to motion of HMD device 200.

Figure 3:
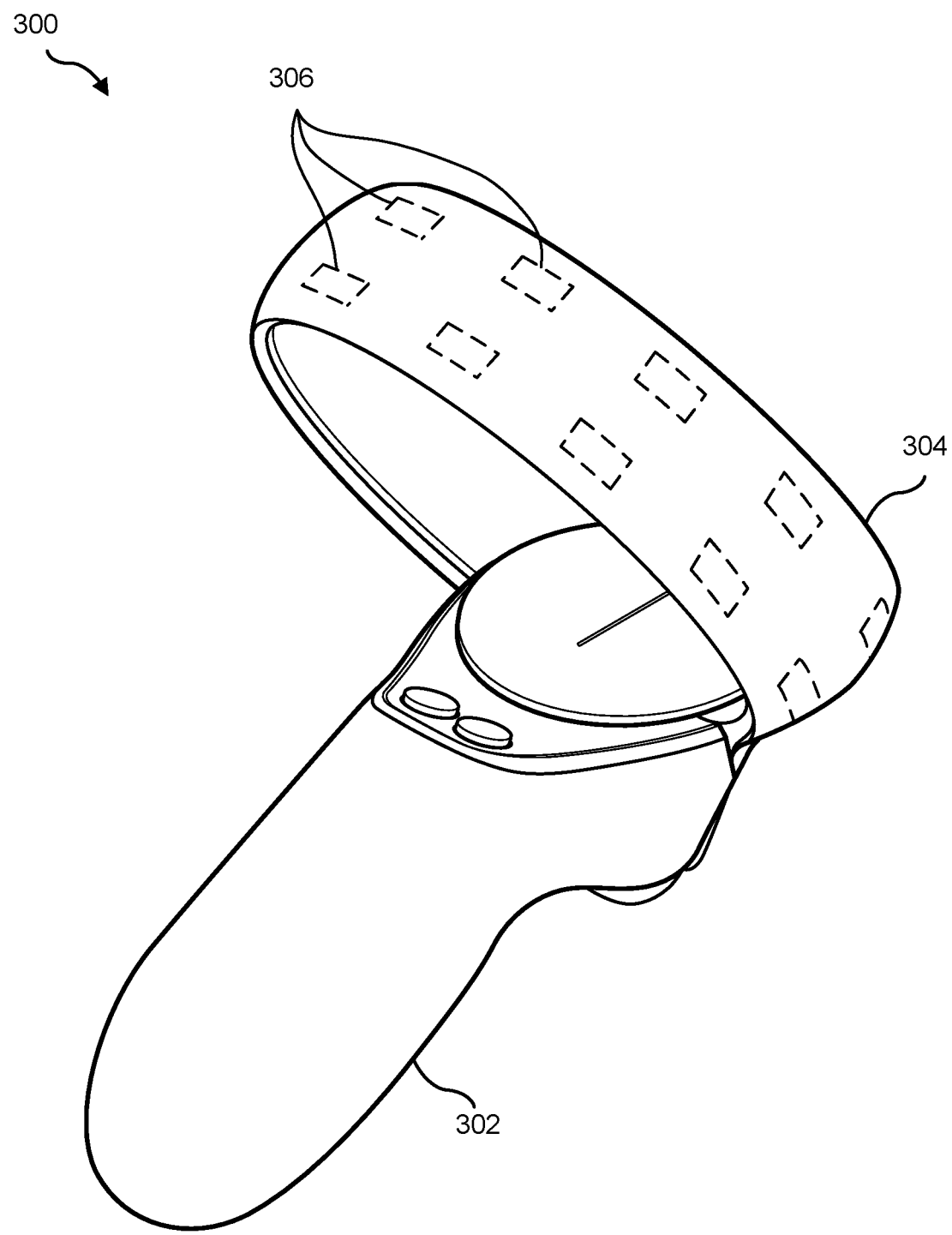
FIG. 3 is a perspective view of an exemplary handheld controller that may be included in the HMD system of FIG. 1.

FIG. 3 is a perspective view of an exemplary handheld controller 300 that may be an embodiment of handheld controller 170 included in HMD system 100 of FIG. 1, in accordance with some embodiments. HMD system 100 may include one or more handheld controllers like handheld controller 300. For example, HMD system 100 may include two handheld controllers 300, with one handheld controller 300 for each of a user's right and left hands. Each handheld controller 300 may be communicatively coupled to HMD device 105 and/or to a computing device (e.g., a personal computer, processing subsystem 110, etc.). Handheld controller 300 may be communicatively coupled to HMD device 105 via any suitable wireless and/or wired connection.

As shown in FIG. 3, handheld controller 300 may include a grip 302 sized to fit within a user's hand. Handheld controller 300 may also include a tracking loop 304 for tracking position, orientation, and/or movement of handheld controller 300 with respect to HMD device 105 and/or with respect to the real-world environment. In some embodiments, tracking loop 304 may include one or more tracking lights 306, such as an array of tracking lights 306. The array of tracking lights 306 may include tracking LEDs (e.g., infrared (IR) LEDs) that are used for motion and positional tracking purposes to provide 360-degree motion control while using HMD system 100. Handheld controller 300 may include tracking lights 306 on any suitable portion of handheld controller 300. In some examples, tracking lights 306 of handheld controller 300 may emit light having wavelengths greater than approximately 700 nm and less than approximately 900 nm. In one embodiment, tracking lights 306 of handheld controller 300 may emit light having a wavelength of approximately 850 nm (e.g., between approximately 840 nm and 860 nm or between approximately 830 nm and 870 nm).

In at least one embodiment, cameras 240A and 240B may receive light emitted by tracking lights 306 on handheld controller 300, and tracking module 155 may utilize the received light to determine location, orientation, and/or movement of handheld controller 300 relative to HMD device 105 and/or another reference frame, such as a reference frame of the real-world environment. In some embodiments, handheld controller 300 may be secured around the user's hand or wrist, e.g., like a glove or a bracelet.

Figure 4A:
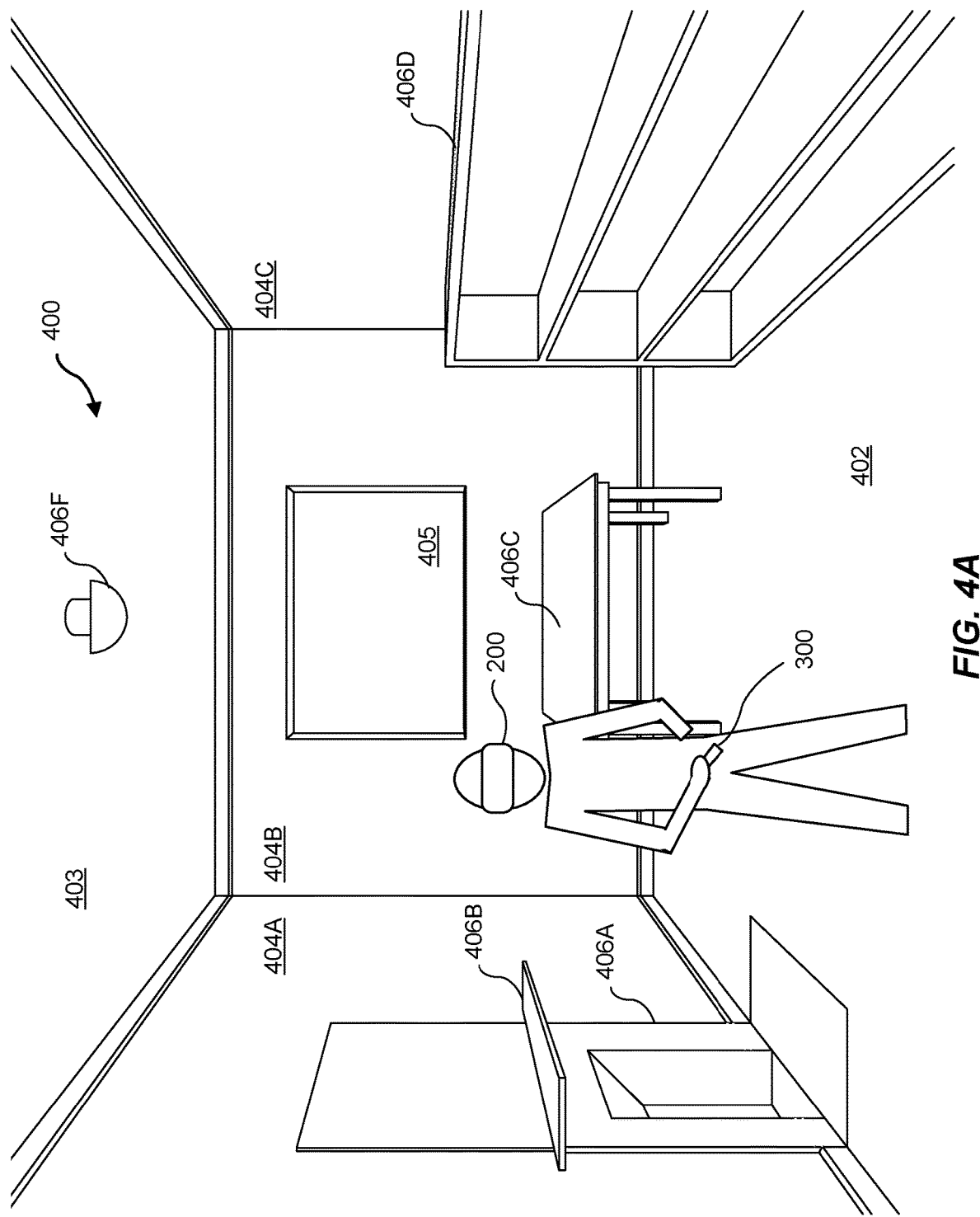
FIGS. 4A, 4B, and 4C are a perspective view, top view, and side view, respectively, of a user wearing the HMD device of FIG. 2 and holding the handheld controller of FIG. 3 in an exemplary real-world environment.
Figure 4B:
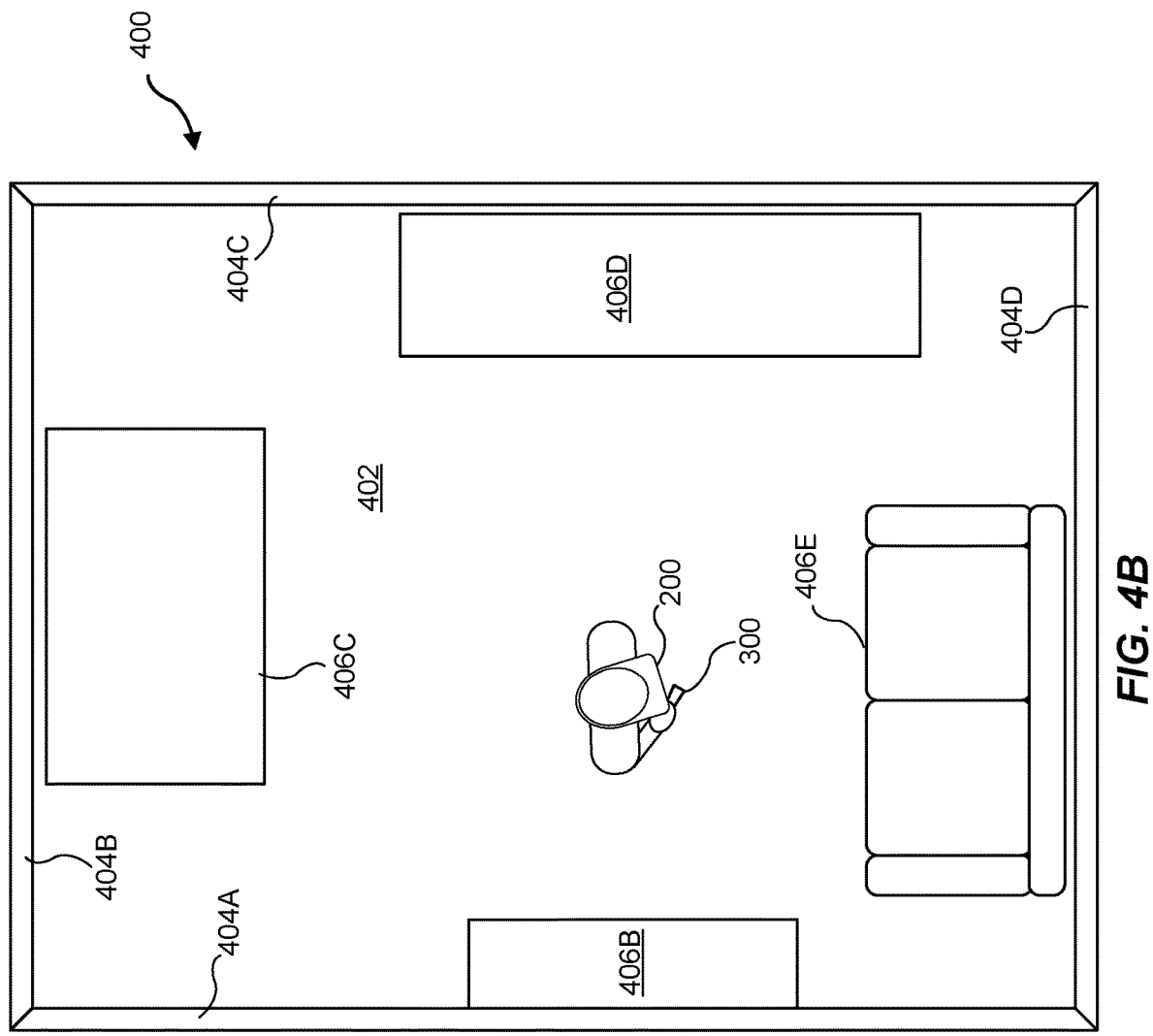
Figure 4C:
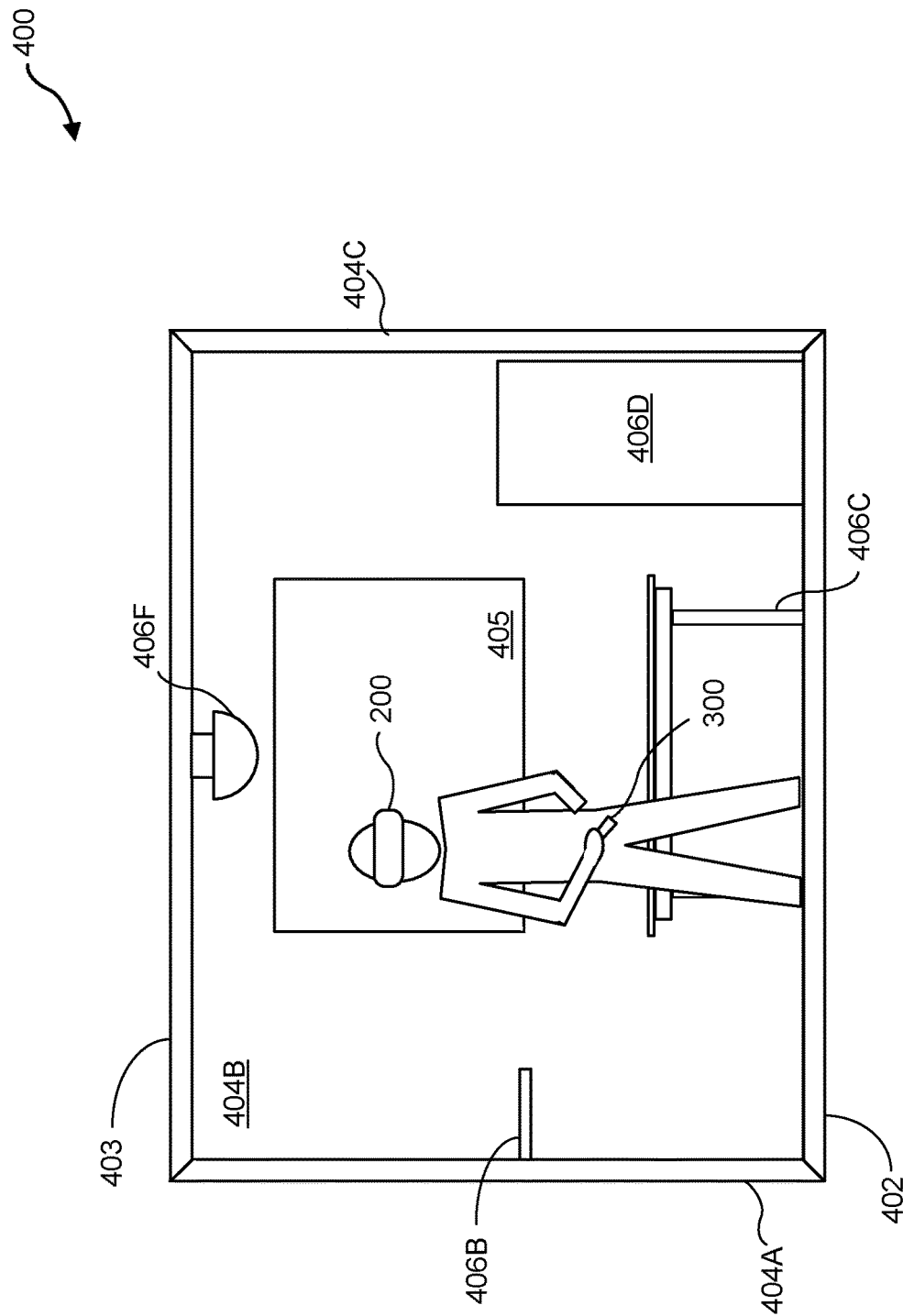

FIGS. 4A, 4B, and 4C present a perspective view, a top view, and a side view, respectively, of a user wearing the HMD device 200 of FIG. 2 and holding handheld controller 300 of FIG. 3 in an exemplary real-world environment 400, such as a living room, according to some embodiments. Real-world environment 400 may include a base plane 402 (also referred to as a floor 402); walls 404A, 404B, 404C, and 404D (collectively referred to as walls 404); and a top plane 403 (also referred to herein as a ceiling 403). FIGS. 4A and 4C also depict a window 405. Real-world environment 400 may further include a plurality of objects or features within the room that may pose collision risks when the user's view is obstructed by the HMD device 200. For example, real-world environment 400 may include a fireplace 406A having a protruding mantelpiece 406B, a table 406C, and shelves 406D. Real-world environment 400 may further include a sofa 406E, as shown in FIG. 4B. Additionally, in some examples, real-world environment 400 may include a light fixture 406F. The objects and features 406A, 406B, 406C, 406D, 406E, and 406F may be referred to, along with the walls 404, floor 402, and ceiling 403, as features or physical surfaces of real-world environment 400.

In some embodiments, the user may move within real-world environment 400 in order to move within a virtual environment displayed in the HMD device 200. In other words, as the user moves within real-world environment 400, the images of a virtual environment shown in electronic display 125 of HMD device 200 may be correspondingly updated based on the user's movements. Accordingly, the user may move relative to the virtual environment as the user moves in real-world environment 400. As described in greater detail below, embodiments of the systems and methods described herein may enable the user to be made aware of one or more portions of real-world environment 400 to prevent the user from colliding with any of the features or physical surfaces when the user cannot see real-world environment 400 (due, e.g., to obstruction of the user's real-world view by HMD device 200).

Figure 5B:
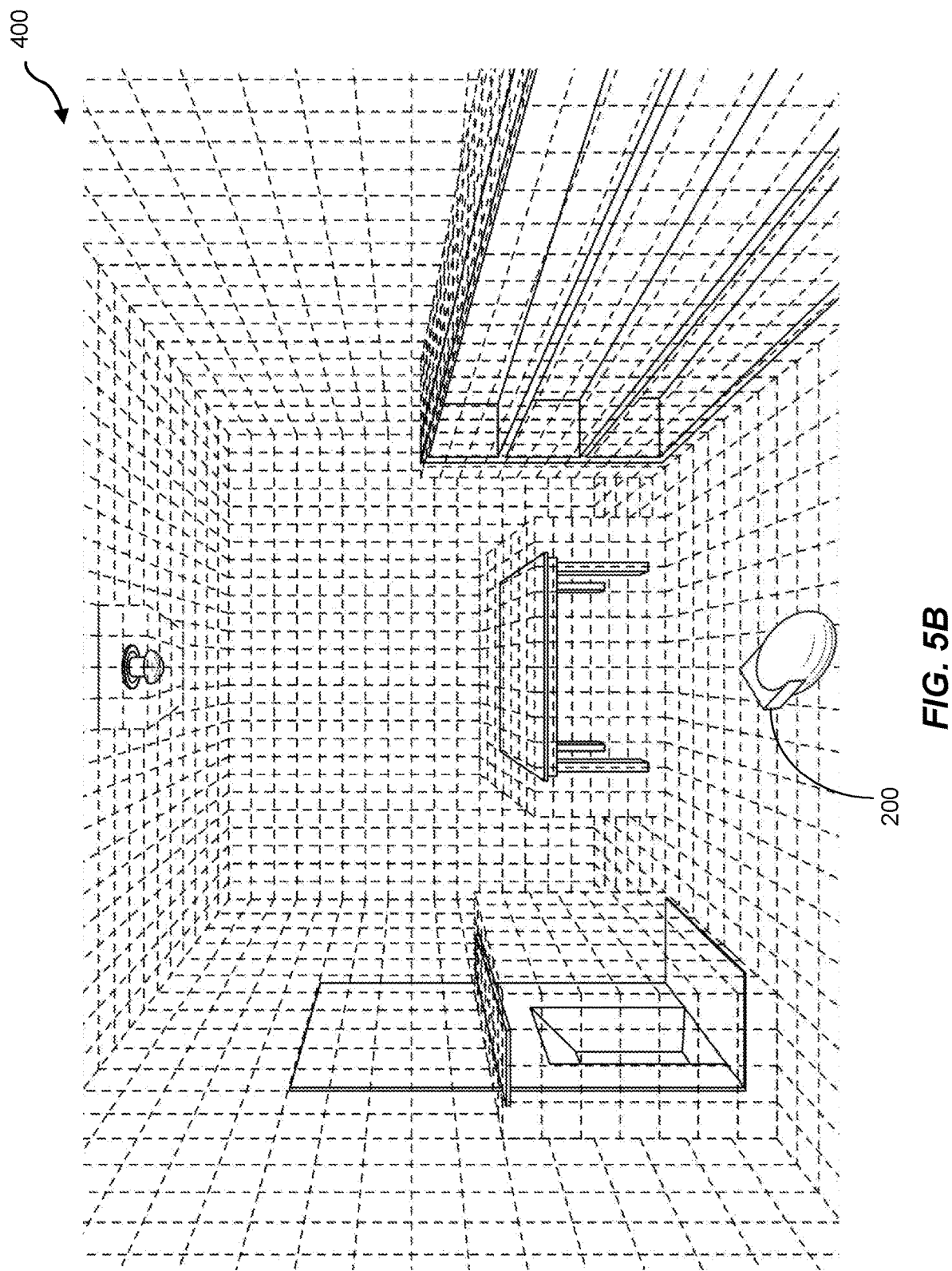

Referring now to FIGS. 5A and 5B, to alert the user of a potential collision risk, HMD system 100 may generate a model of his or her real-world environment 400. More specifically, FIGS. 5A and 5B present perspective views of a user wearing HMD device of 200 of FIG. 2 for generation of a model of real-world environment 400 during a training phase, according to some embodiments. FIG. 5A presents a perspective view of the user wearing HMD device 200 after the model has been partially generated, while FIG. 5B is a perspective view of the user wearing HMD device 200 after completion of the model.

When the user is configuring HMD system 100 and HMD device 200 for use in real-world environment 400 for the first time, HMD system 100 may prompt the user to collect depth and image information from real-world environment 400. In this way, HMD system 100 may be trained with respect to real-world environment 400, such as for determining a safety boundary for the user within that environment. In some examples, HMD system 100 may provide the user with a visual prompt in the electronic display 125 and/or an audio instruction to the user, directing the user to manipulate HMD device 200 to collect data. Because various sensing subsystems of the HMD device 200 may collect data that is generally in front of HMD device 200, the user may be instructed to take steps to visualize the entirety of real-world environment 400, such as by orienting HMD device 200 toward various portions of real-world environment 400 while the model is being generated (e.g., as depicted in FIG. 5A) until the model is completed (e.g., as illustrated in FIG. 5B). In other embodiments, the training phase may entail collecting depth data (e.g., a depth map) for the entirety of real-world environment 400, after which the model may be generated. For example, depth-sensing subsystem 120 and/or image capture subsystem 130 may collect data from the environment, which may be processed by processing subsystem 110 and/or image processing engine 160 to generate the model and and/or to determine the user's position with respect to the model. Tracking module 155, or another component of HMD system 100, may monitor which portions of real-world environment 400 have been adequately captured by the user's manipulation. HMD system 100 may direct the user to orient HMD device 200 to capture additional portions of real-world environment 400 until all or substantially all of real-world environment 400 been adequately observed. As more of real-world environment 400 is viewed, more of the model may be completed. In some embodiments, the model may only be generated after HMD system 100 determines that a sufficient portion of the environment has been observed, as shown in FIG. 5B.

In some embodiments, the depth data collected (e.g., via depth-sensing subsystem 120 and/or other components of HMD system 100) may identify a plurality of locations in three-dimensional space of real-world environment 400 that correspond to the features or physical surfaces of real-world environment 400. Based on the plurality of locations, in some examples, HMD system 100 (e.g., via image processing engine 160) may identify a set of grid coordinates within a three-dimensional grid oriented with real-world environment 400 that are indicative of the physical surfaces or features (e.g., walls 404, fireplace 406A, mantelpiece 406B, table 406C, and so on).

In some examples, HMD system 100, based on data received from depth-sensing subsystem 120, IMU 140, and/or other components), may determine a dominant plane within, or associated with, real-world environment 400, relative to which the three-dimensional grid may be aligned. In some embodiments discussed in greater detail below, the dominant plane may be a horizontal plane that may divide real-world environment 400 into an upper region and a lower region. Further, in various examples, the dominant plane may be a horizontal plane that may coincide at least somewhat with HMD device 200 as the user is standing in real-world environment 400. In other embodiments, the dominant plane may be a horizontal plane that may be slightly higher than HMD device 200 (e.g., higher than a height of the user), or out of reach of the user, as the user is standing in real-world environment 400. In other examples, the dominant plane be a horizontal plane that may coincide with floor 402 or ceiling 403. In yet other examples, the dominant plane may be a vertical plane, such as a vertical plane that coincides with one of walls 404.

In addition to defining the dominant plane, HMD system 100 may align the three-dimension grid with the dominant plane. In addition, in some examples, HMD system 100 (e.g., via depth-sensing subsystem 120) may sense at least one planar surface in real-world environment 400 that is orthogonal to the dominant plane. For example, for a horizontal dominant plane, HMD system 100 may sense a vertical surface (e.g., one of walls 404) in real-world environment 400. HMD system 100 (e.g., via image processing engine 160) may then align the three-dimensional grid along both the dominant (e.g., horizontal) plane and the sensed planar (e.g., vertical) surface.

In some embodiments, HMD system 100 (e.g., using image processing engine 160) may identify the set of grid coordinates that are indicative of the physical surfaces or features of real-world environment 400 within the three-dimensional grid (described above) based on the plurality of sensed locations that correspond to the surfaces. Also in some examples, the plurality of grid coordinates may be based on the plurality of locations relative to the dominant plane. Based on these grid coordinates, HMD system 100 (e.g., using image processing engine 160) may determine a safety boundary that may be employed by HMD system 100 to notify the user of HMD system 100 of the user's proximity to the physical features.

In some embodiments, the set of grid coordinates may represent the model of real-world environment 400 mentioned above, either directly or indirectly. For example, the set of grid coordinates may be interpreted or represented as columns of volumetric elements that are aligned with the three-dimensional grid. For example, HMD system 100 (e.g., using image processing engine 160), as depicted in FIGS. 5A and 5B, may define multiple vertical columns 504 of volumetric elements 502 that are aligned with the three-dimensional grid based on the set of grid coordinates (and, thus, the plurality of locations) relative to the dominant plane. Further, in some examples, each volumetric element 502 may be associated with a corresponding grid coordinate of the set of grid coordinates. Further, as depicted in FIGS. 5A and 5B, the resulting vertical columns 504 of volumetric elements 502 may at least partially coincide with the various physical surfaces or features of real-world environment 400, including one or more of floor 402, ceiling 403, walls 404, fireplace 406A, mantelpiece 406B, table 406C, shelves 406D, sofa 406E, and light fixture 406F.

Figure 6A:
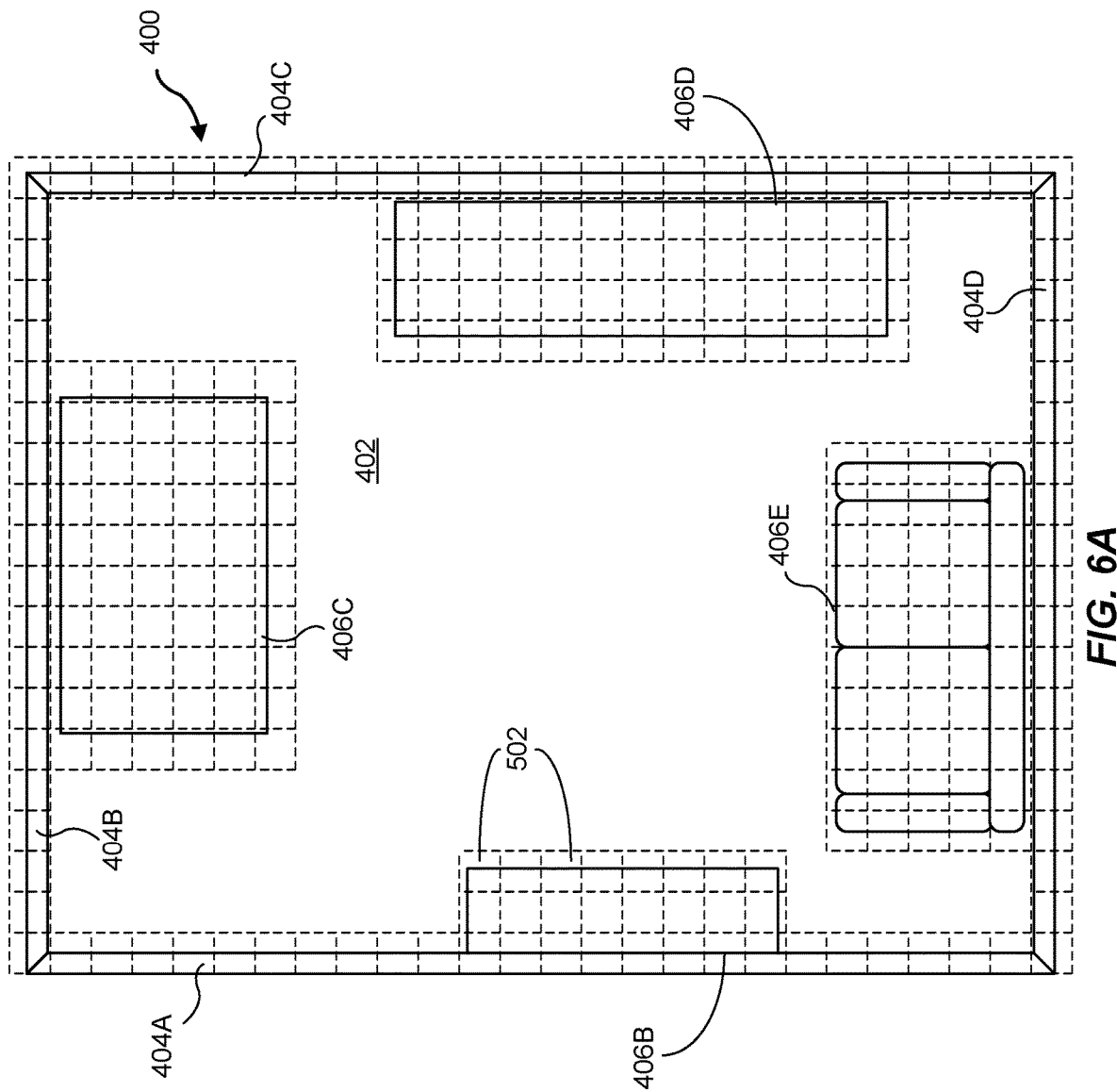
FIGS. 6A, 6B, and 6C are a top view, a side view, and another side view, respectively, of the real-world environment of FIGS. 4A, 4B, and 4C in conjunction with the generated model of FIG. 5B.
Figure 6B:
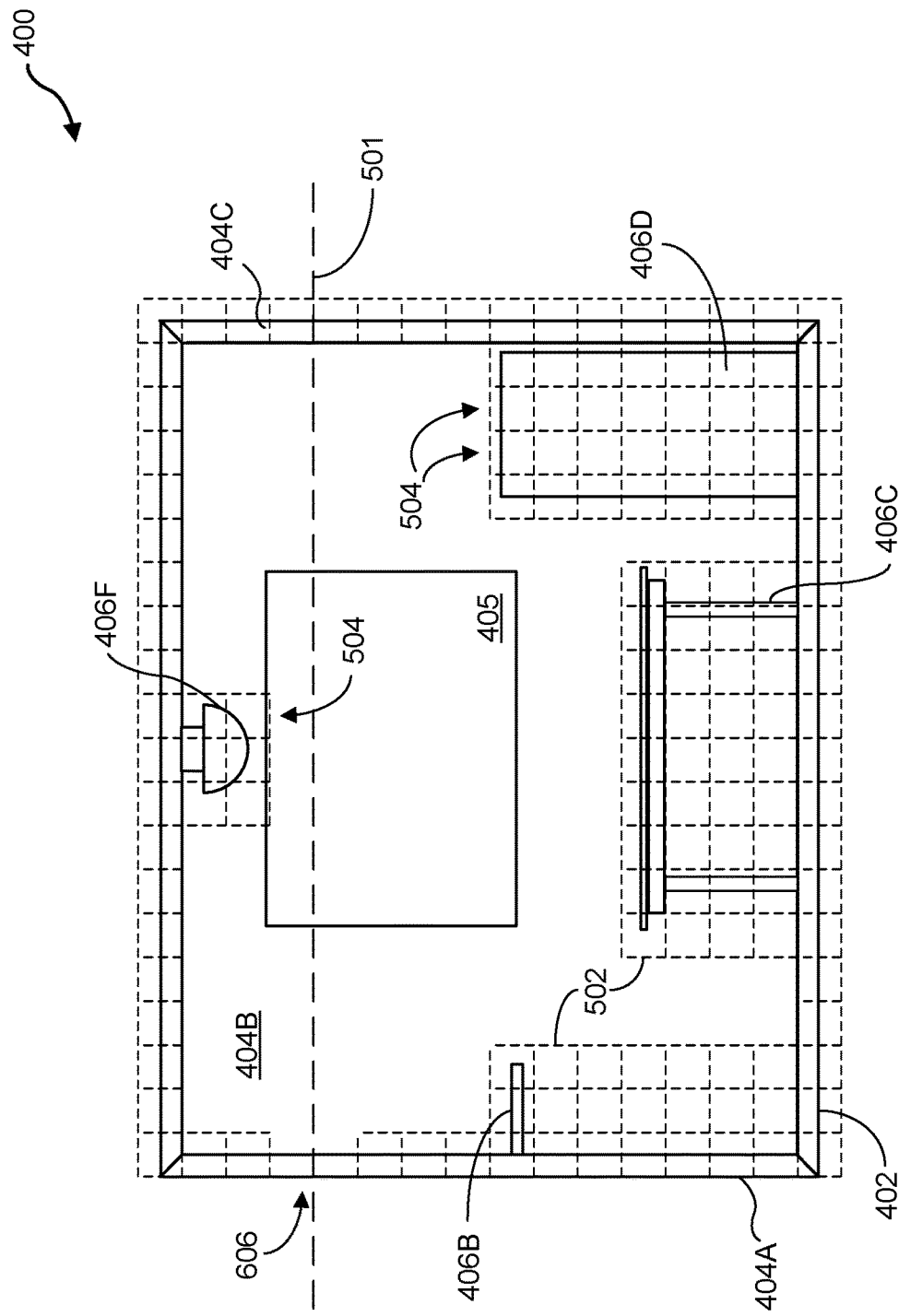
Figure 6C:
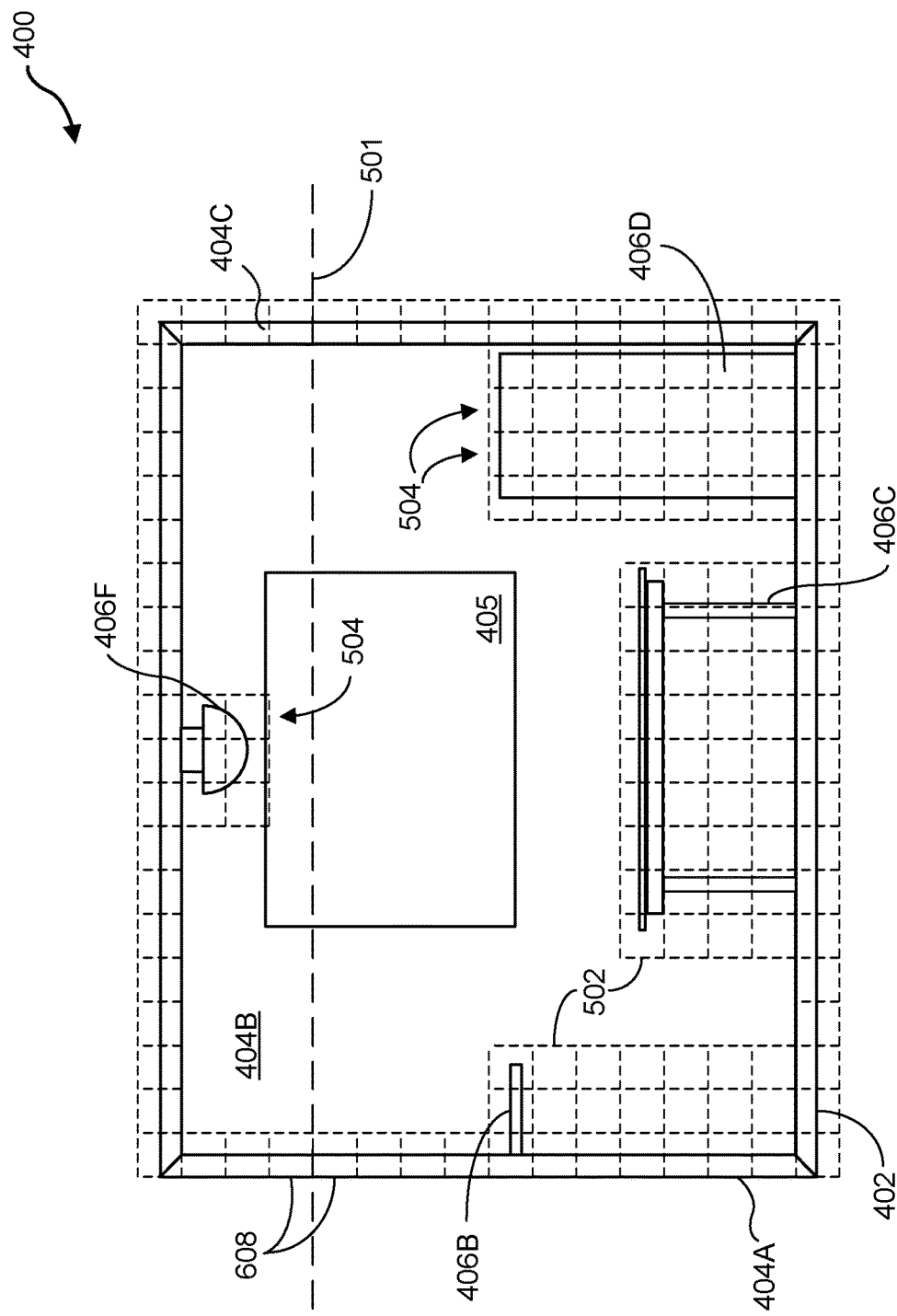

To further describe the generation and use of vertical columns 504 or volumetric elements 502, FIG. 6A provides a top view of real-world environment 400 that includes volumetric elements 502, while omitting those volumetric elements 502 that specifically represent floor 402 and ceiling 403 for clarity of presentation. Similarly, FIGS. 6B and 6C provide side views of real-world environment 400 that includes volumetric elements 502, while omitting those volumetric elements 502 representing walls 404B and 404D, again for clarity of presentation. In some examples, each volumetric element 502 may be a cube measuring 10-to-20 centimeters on a side; however, other sizes may be employed for volumetric elements 502 in other examples. Moreover, while volumetric elements 502 are depicted in FIGS. 6A, 6B, and 6C as cubes having equal lengths in all three dimensions, volumetric elements 502 may not be so dimensioned in other embodiments. For example, each volumetric element 502 may have a different height relative to its width or depth. Other variations in shapes and sizes for volumetric elements 502 are also possible.

As illustrated in FIGS. 6A and 6B, in some examples, for a first sensed location in real-world environment 400, identifying one or more of the grid coordinates associated with the first sensed location may include defining a first volumetric element 502 at the first sensed location, and possibly defining one or more additional volumetric elements 502 contiguously with the first volumetric element 502 to form a vertical column 504. In some embodiments, the additional volumetric elements 502 may extend (e.g., vertically) away from a dominant (e.g., horizontal) plane 501 defined above. For example, detection of various portions of mantelpiece 406B may result in a number of top volumetric elements 502 being defined that generally include mantelpiece 406B. In addition, additional volumetric elements 502 may be added to each top volumetric element 502, extending away from dominant plane 501 (e.g., downward toward floor 402), thus forming a vertical column 504 for each top volumetric element 502. Consequently, the resulting vertical columns 504 may describe a volume within real-world environment 400 that may be viewed as a potential danger to the user. In this particular example, even though the actual volume consumed by mantelpiece 406B is much less than that described by the associated vertical columns 504, the volume underneath mantelpiece 406B would be unusable to a standing user of HMD device 200, making the formation of vertical columns 504 for mantelpiece 406B useful to prevent a collision of the user with mantelpiece 406B. Similarly, as depicted in FIGS. 6A and 6B, an entirety of the volume underneath table 406C may be represented by volumetric elements 502 forming multiple vertical columns 504, from the top of table 406C downward.

In some examples, an initial sensed surface of an object (e.g., by depth-sensing subsystem 120), such as an intermediate shelf of shelves 406D, may not be the highest surface that is sensed. Accordingly, in some embodiments, a topmost volumetric element 502 denoting the top end of a vertical column 504 associated with shelves 406D may not initially extend to the topmost surface of shelves 406D during the training phase. Subsequently, sensing the topmost surface of shelves 406D, in some examples, may cause an additional volumetric element 502 to be defined at the topmost surface, followed by the defining of additional volumetric elements 502 between the additional volumetric element 502 the current vertical column 504, thus causing the vertical column 504 to be extended from the topmost surface of shelves 406D downward toward floor 402. Thereafter, if another surface of shelves 406D is sensed below the topmost surface, no changes in volumetric elements 502 of the associated vertical column 504 may be made, as the vertical column 504 already accurately depicts that portion of shelves 406D.

In some embodiments, as described above, a sensed surface location below dominant plane 501 may result in the formation of a vertical column 504 from the sensed location extending vertically downward (e.g., toward floor 402). Correspondingly, in some examples, a sensed surface location above dominant plane 501 may result in the generation of an associated vertical column 504 that extends upward (e.g., toward ceiling 403). For example, as shown in FIG. 6B, sensing lower surfaces of light fixture 406F (located above dominant plane 501) may result in the definition of individual volumetric elements 502 at the lower surface of light fixture 406F, as well as the definition of additional volumetric elements 502 extending upward therefrom to form multiple vertical columns 504 encompassing light fixture 406F. Therefore, in such examples, tables and other objects that may represent a potential hazard may be distinguished from highly-placed objects that, depending on the height of the user, may not represent an immediate hazard for the user of HMD device 200.

In the neighborhood of dominant plane 501, in some examples, two separate, but vertically aligned, vertical columns 504, such as for representing wall 404A, as shown in FIG. 6B, on opposite sides of dominant plane 501 may be defined, leaving a gap 606 therebetween. In some embodiments, HMD system 100 (e.g., using image processing engine 160), based on a distance between the two aligned vertical columns 504 being less than some threshold value (e.g., in terms of a number of volumetric elements 502, or in terms of a measured distance) may fill gap 706 with one or more additional volumetric elements 608 so that the two separate vertical columns 504 may form a single, joined vertical column 504 that more accurately represents wall 404A. While walls 404 may be modeled more accurately in such examples, other objects of a real-world environment (e.g., columns and other vertically oriented objects) may also be correctly modeled.

While the volumetric elements 502 of adjacent vertical columns 504 are displayed in FIGS. 6A, 6B, and 6C as aligning horizontally (e.g., lying in the same horizontal plane), such an alignment may be not required in other embodiments. In some examples, volumetric elements 502 of a vertical column 504 may not be aligned with corresponding volumetric elements 502 of a nearby vertical column 504. Instead, in some embodiments, a volumetric element 502 associated with a top surface of an object may be aligned with that top surface in some fashion, resulting in a vertical offset between volumetric elements 502 associated with that object compared to other volumetric elements 502 of the same real-world environment 400.

In some embodiments (e.g., after completion of a training phase, as described above), once a model of real-world environment 400 include vertical columns 504 of volumetric elements 502 substantially encompassing physical surfaces or features of real-world environment 400, HMD system 100 (e.g., via image processing engine 160) may determine a safety boundary that may be employed by HMD system 100 (e.g., during an interactive or operational phase in which a virtual environment is presented to the user) to notify a user of HMD system 100 of a user's proximity to the physical surfaces.

Figure 7A:
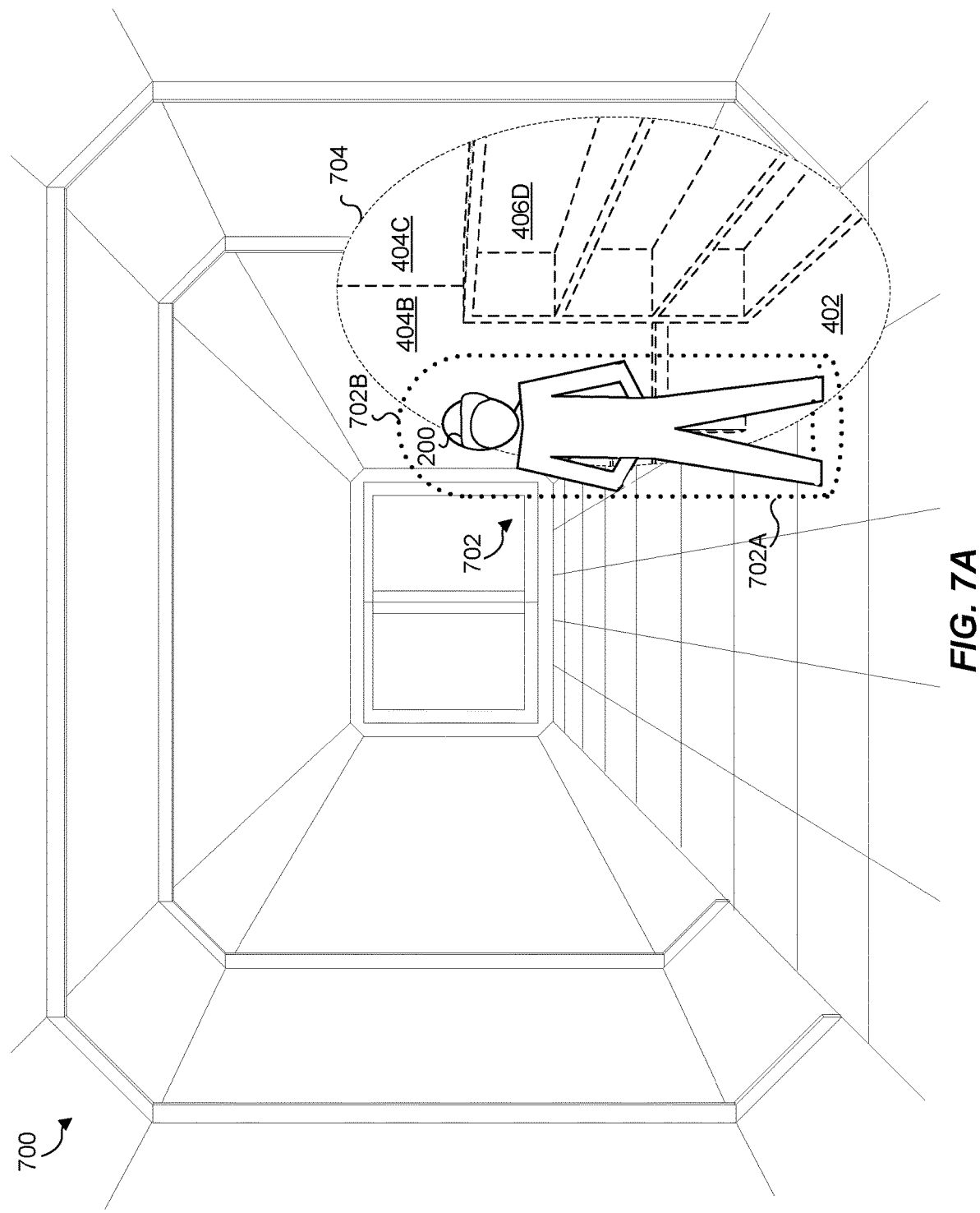
FIGS. 7A and 7B are a side view and a top view, respectively, of a user wearing the HMD device of FIG. 2 interacting with a virtual environment and the generated model of the real-world environment of FIGS. 4A, 4B, and 4C in response to encroachment of the user upon a safety boundary.
Figure 7B:
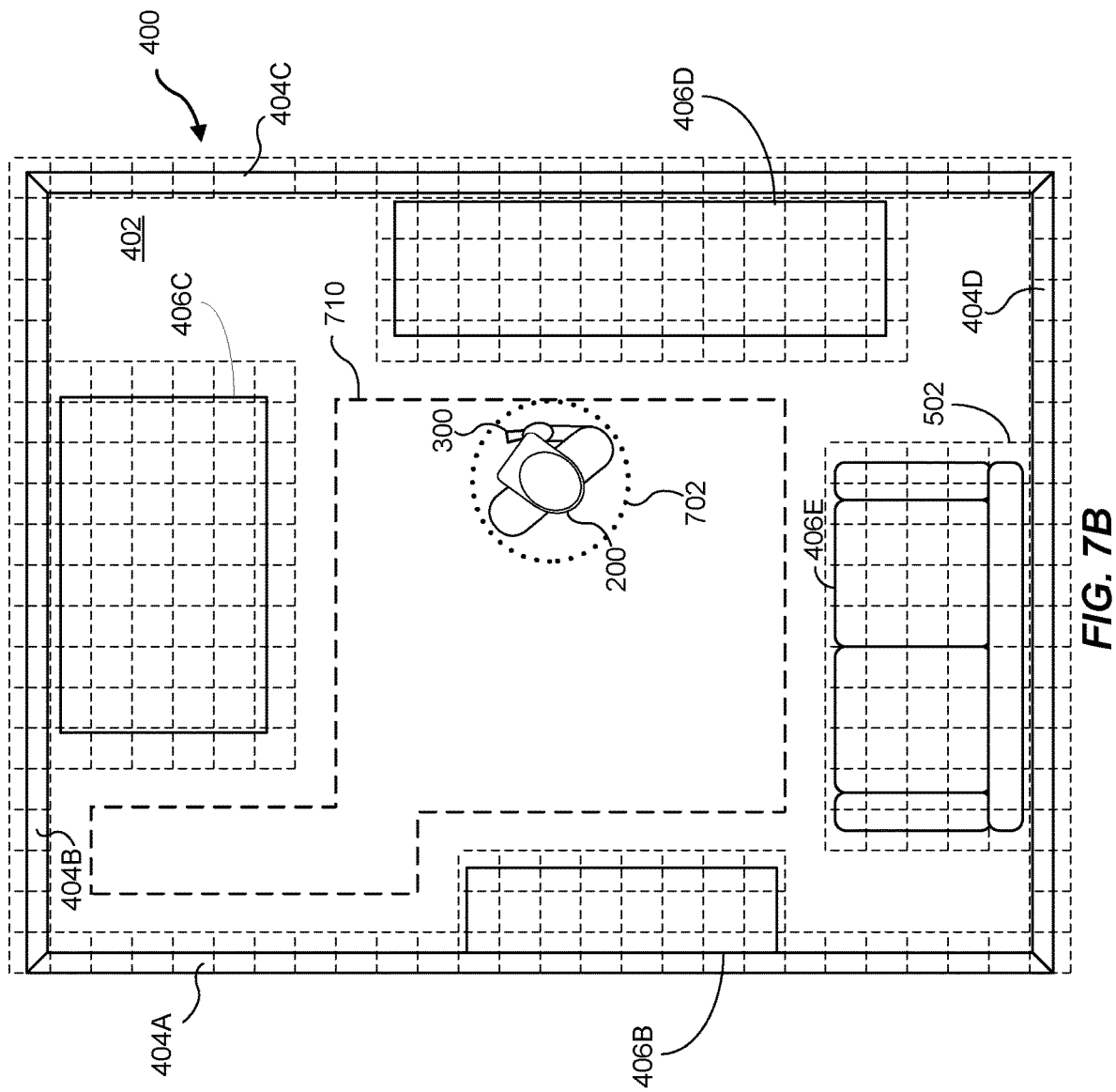

For example, FIGS. 7A and 7B depict a virtual environment 700 to the user (e.g., via electronic display 125), thus obscuring at least a portion of the user's view of real-world environment 400. In this example, the user has approached and/or encroached a safety boundary 710 (as shown in FIG. 7B). In response, HMD system 100 may notify the user that physical contact with a feature (e.g., shelves 406D) may be imminent. In some embodiments, to notify the user, HMD system 100 may display a rendering of a nearby portion of the feature (e.g., using image capture subsystem 130 and electronic display 125), possibly within a window 704 in conjunction with virtual environment 700 (e.g., as depicted in FIG. 7A), thus possibly alerting the user of the user's position within real-world environment 400. Additionally, because the user controls the position and orientation of HMD device 200 by moving about within real-world environment 400 and by "looking" in a particular direction, the user can control what portion of virtual environment 700 may be displayed in HMD device 200. However, in other embodiments, other ways of notifying the user of encroachment of safety boundary 710 (e.g., an audio warning, a visual flashing of a portion of virtual environment 700 associated with the risk of contact with real-world environment 400, and so on) may be employed.

In yet other examples, HMD system 100 (e.g., via image capture subsystem 130 and electronic display 125) may incorporate or create elements of virtual environment 700 to coincide with physical surfaces or features of real-world environment 400 as a form of notifying the user of the user's proximity to such features. Consequently, such a notification may be incorporated into virtual environment 700, thus providing the user with a measure of safety regarding real-world environment 400 without interrupting or otherwise adversely affecting the presentation of virtual environment 700.

In some embodiments, a proxy location or personal zone may be utilized by HMD system 100 to simplify determinations of the user's position with respect to real-world environment 400. For example, a personal zone 702 may include a substantially cylindrical portion 702A and a substantially hemispherical portion 702B, as illustrated in FIG. 7A. Other geometries may be used to construct personal zone 702 in other embodiments. Hemispherical portion 702B may be centered around HMD device 200, while cylindrical portion 702A may extend downward from hemispherical portion 702B to floor 402. However, other volumes may be used to provide personal zone 702. Also, in some embodiments, the diameter of cylindrical portion 702A may be determined by the tracked locations of one or more handheld controllers 170 and/or by the tracked locations of the hands of the user, such that when the user's arms are extended, the diameter of personal zone 702 may be dynamically increased. In other embodiments, a fixed size of personal zone 702 may be used and may be large enough to cover a maximum reach of a user.

In some examples, as exemplified in FIG. 7B, safety boundary 710, which is based on volumetric elements 502, may provide some "safety margin" of distance from volumetric elements 502 to provide some margin of safety when the user is moving about real-world environment 400. Consequently, when the user (e.g., as represented by personal zone 702) encroaches upon, or otherwise closely approaches, safety boundary 710, as depicted in FIG. 7B, the user is notified (e.g., visually, as shown in FIG. 7A). In other examples, safety boundary 710 may be defined by volumetric elements 502 (e.g., without an accompanying safety margin, as employed in FIG. 7B).

Figure 8:
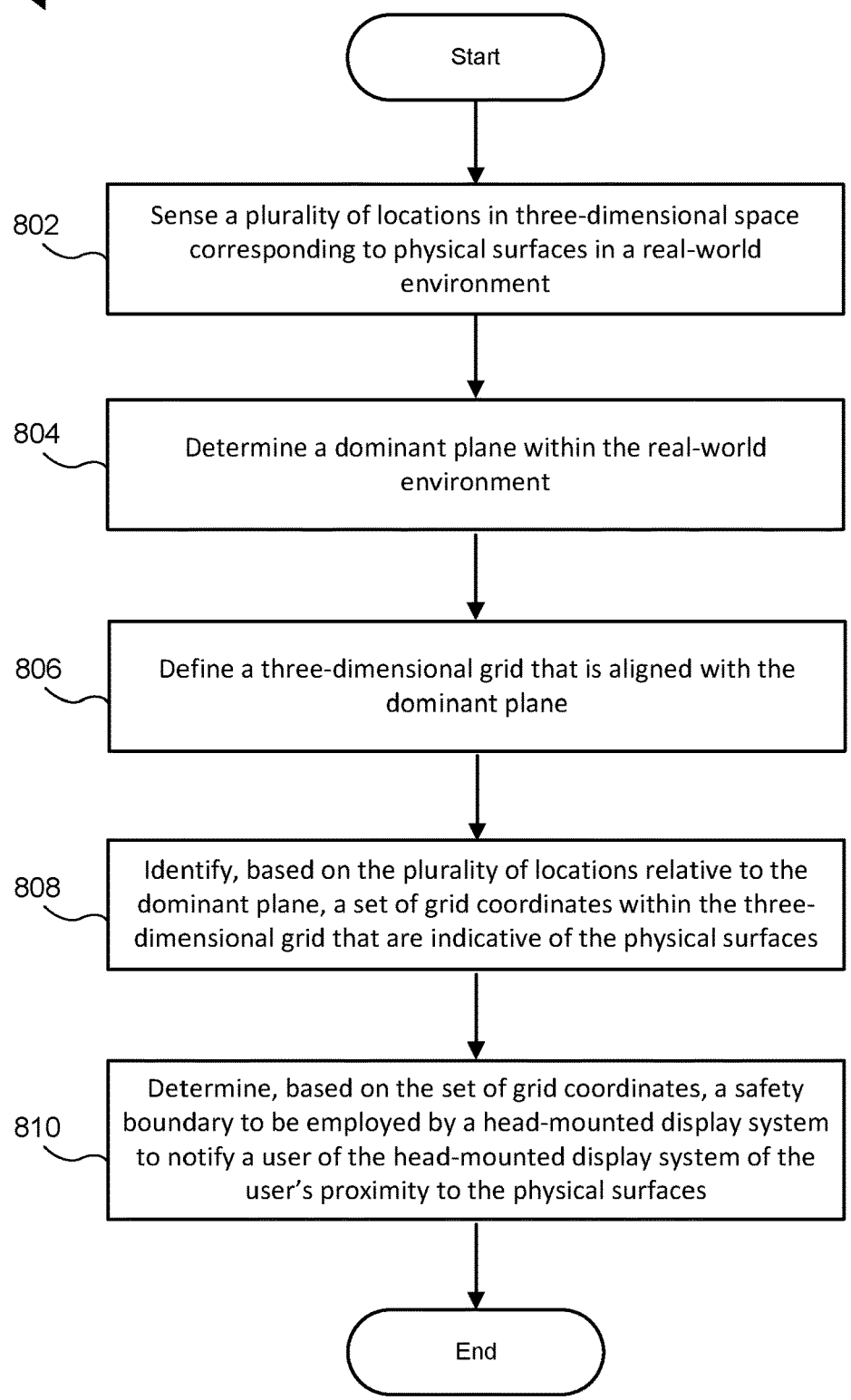
FIG. 8 is a flow diagram of an exemplary method of determining a safety boundary for a mobile artificial reality user.

FIG. 8 is a flowchart of an exemplary method 800 for determining a safety boundary for a mobile artificial reality user. As depicted in FIG. 8, method 800 may include a series of enumerated operations or steps. Embodiments of method 800 may include additional operations before, after, in between, or as part of the enumerated operations. Some embodiments of method 800 may be performed by processing subsystem 110 in connection with other components of HMD system 100. Additionally, some embodiments of method 800 may include a set of instructions, stored on a computer-readable storage medium, that when executed by a processing device, such as processing subsystem 110, cause the processing device to perform some or all of the operations included in embodiments of method 800. In some embodiments, the operations may be performed in a sequence that is different than the sequence depicted in FIG. 8.

Accordingly, some embodiments of method 800 may begin at step 802 in which one or more components (e.g., depth-sensing subsystem 120 of HMD system 100) may sense a plurality of locations in three-dimensional space corresponding to physical surfaces (e.g., floor 402, ceiling 403, walls 404, fireplace 406A, mantelpiece 406B, table 406C, and so on) in a real-world environment (e.g., real-world environment 400). In some examples, reflections, from the physical surfaces, of structured light emitted from HMD system 100 may be employed to sense the plurality of locations, as described above. At step 804, one or components (e.g., IMU 140 and/or depth-sensing subsystem 120) may determine a dominant plane (e.g., dominant plane 501) within the real-world environment. In some embodiments, the dominant plane may be a horizontal plane located near a height of HMD device 200 when worn by the user. Further, at step 806, one or more components (e.g., depth-sensing subsystem 120) may determine a three-dimensional grid that is aligned with the dominant plane. In some examples, the definition of the three-dimensional grid is aligned with both the dominant plane and at least one surface sensed in the real-world environment (e.g., a wall 404).

At step 808, based on the plurality of locations relative to the dominant plane, a set of grid coordinates may be identified within the three-dimensional grid (e.g., using image processing engine 160) that are indicative of the physical surfaces. In some embodiments, the set of grid coordinates may be represented as a set of volumetric elements (e.g., volumetric elements 502) that form vertical columns (e.g., vertical columns 504) that begin from a sensed physical surface and extend away from the dominant plane, as described above. Consequently, in some examples, the volumetric elements may define (e.g., encompass) the various physical surfaces or features of the real-world environment. In yet other embodiments, the vertical columns may appear to grow (e.g., from floor 402 or ceiling 403) toward the dominant plane, such as by adding volumetric elements to the vertical columns as the vertical columns grow. At step 810, in some examples, based on the set of grid coordinates, a safety boundary (e.g., safety boundary 710) may be determined (e.g., using image processing engine 160), where the safety boundary is to be employed by an HMD system (e.g., HMD system 100) to notify a user of the HMD system of the user's proximity to the physical surfaces. In some embodiments, the safety boundary may be aligned with surfaces of the volumetric elements, while in other examples, the safety boundary may be based on surfaces of the volumetric elements while incorporating a safety margin of some distance such that a user may be alerted to a possible collision with a physical surface when the user encroaches, or at least approaches, the safety boundary (e.g., as determined by one or more position sensors 135, IMU 140, or the like, in conjunction with tracking module 155). In some examples, tracking module 155 may generate a personal zone (e.g., personal zone 702) for the user as a proxy for the position of the user. Also, in some embodiments, the HMD system may alert the user visually (e.g., using electronic display 125), audially (using an audio speaker), or otherwise. For example, the HMD system may display a representation of at least a portion of the real-world environment (e.g., based on captured images of real-world environment 400 using image capture subsystem 130), possibly in combination with a presentation of a virtual environment, to alert the user of a potential collision. In other implementations, the HMD system may represent one or more physical surfaces or features as elements of a virtual environment, thus notifying the user of the possible presence of the surface or features continuously without interrupt the user's perception of the virtual environment. Further, in some examples, steps 802 through 808 may be performed as part of a training phase (e.g., when HMD system 100 is be employed by the user in an unknown or unfamiliar real-world environment), while step 810 may be performed during an interactive phase (e.g., during presentation of the virtual environment to the user).

Figure 9:
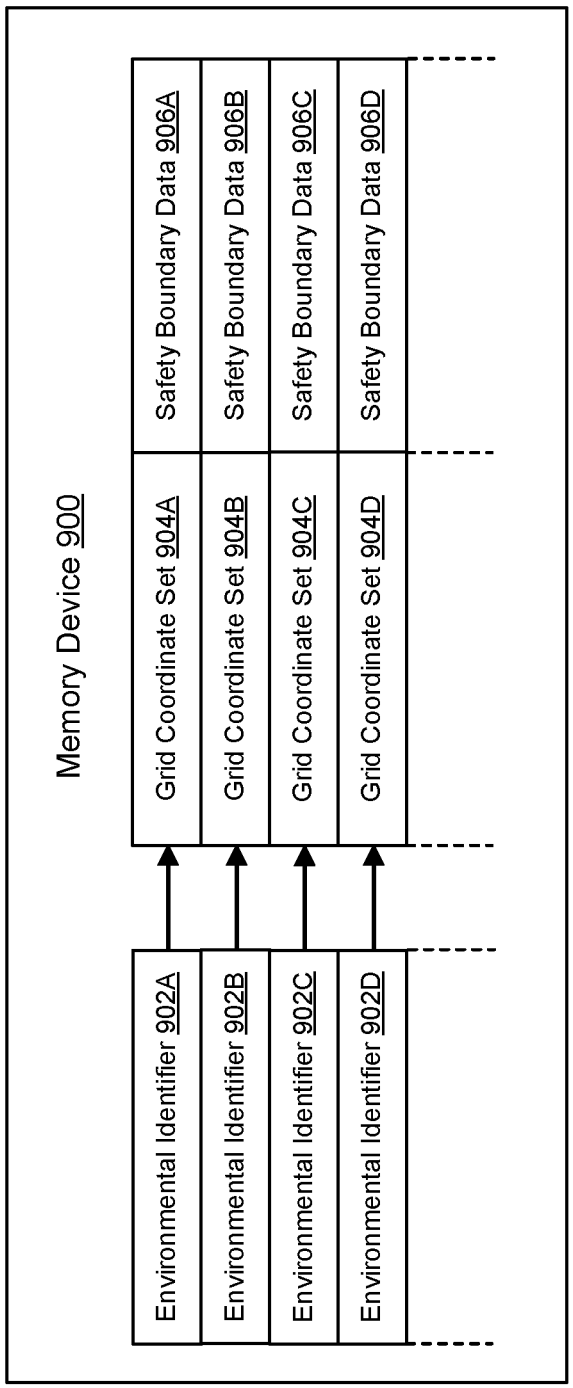
FIG. 9 is a block diagram of an exemplary memory device including a set of environmental identifiers that correspond to existing grid coordinate sets and safety boundary data.

FIG. 9 is a block diagram of an exemplary memory device 900 containing a set of environmental identifiers 902A, 902B, and so on (more generally, environmental identifier 902), each of which corresponds to a particular grid coordinate set 904A, 904B, etc. (generally, grid coordinate set 904) and safety boundary data 906A, 906B, and so forth (generally, safety boundary data 906). In some examples, memory device 900 may be included in processing subsystem 110 of HMD system 100. To simplify the use of HMD system 100, processing subsystem 110 may generate environmental identifiers 902 based on two-dimensional or three-dimensional information characterizing a real-world environment (e.g., real-world environment 400). For example, an environmental identifier 902 may include one or more two-dimensional images of a user's living room. The user may be prompted during an initiation phase to capture image data from the living room by "looking" around the room while wearing HMD device 200. The amount of detail captured may be lower than is required during the training phase, so the initiation phase may take less time than the training phase. The images captured during the initiation phase may be compared with images saved as an environmental identifier 902 in the memory device 900. In other embodiments, two-dimensional images or data maps may be processed to generate an environmental identifier 902 that may require less memory than the two-dimensional images or data maps themselves.

In some embodiments, HMD system 100 may compare an environmental identifier 902 captured during the initiation phase with each stored environmental identifier 902. When a match is found, HMD system 100 may retrieve a corresponding grid coordinate set 904 and safety boundary data 906 from memory device 900. As an example, if HMD system 100 determines that environmental identifier 902 captured during an initiation phase matches stored environmental identifier 902B, HMD system 100 may retrieve and use grid coordinate set 904B and/or safety boundary data 906B because they correspond to environmental identifier 902B within memory device 900.

If, instead, HMD system 100 does not find a stored environmental identifier 902 that corresponds to the environmental identifier 902 captured during the initiation phase, HMD system 100 may enter a training phase in which the user is directed to capture information that HMD system 100 can use to generate and store a model (e.g., including a grid coordinate set 904 and or associated safety boundary data 906), as described above. Enabling HMD system 100 to subsequently retrieve such a stored model may save time for the user, allowing the user to begin an interaction phase of a VR session more quickly.

Embodiments of the present disclosure may provide systems and methods for determining a safety boundary for a mobile artificial reality user. As discussed above, such systems and methods may help a VR system user to become more aware of the user's surrounding real-world environment, particularly when the user's view of that environment is partially or completely obstructed by an HMD device. Further, in various embodiments discussed above, determination of the safety boundary may be based on a set of grid coordinates (e.g., represented in a model as columns of volumetric elements) associated with physical surfaces or other features of the real-world environment. Representing the real-world in such a manner may be time-saving and memory-efficient (e.g., as minute details regarding the various physical surfaces of the real-world environment need not be registered or saved) while providing an effective method of notifying or alerting the user to potential collisions while moving within the real-world environment during use of an HMD system.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

[own] In some examples, the term "memory device" genera y refers to any type or form of volatile or non-volatile storage device or medium capable of storing data and/or computer-readable instructions. In one example, a memory device may store, load, and/or maintain one or more of the modules described herein, Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive sensor data (e.g., from depth-sensing subsystem 120) to be transformed, transform the sensor data to represent physical surfaces within a real-world environment (e.g., real-world environment 400), output a result of the transformation to define a safety boundary for a user, use the safety boundary to alert the user to a potential collision of the user with the real-world environment, and store the result of the transformation for future use when the user is to operate with the same real-world environment. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   sensing, via a depth-sensing subsystem, a plurality of locations in three-dimensional space corresponding to physical surfaces in a real-world environment;
   determining a dominant plane within the real-world environment, wherein the dominant plane comprises a horizontal plane dividing the real-world environment into an upper region and a lower region;
   defining a three-dimensional grid that is aligned with the dominant plane;
   identifying, based on the plurality of locations relative to the dominant plane, a set of grid coordinates within the three-dimensional grid that are indicative of the physical surfaces;
   defining, based on the set of grid coordinates, vertical columns of volumetric elements aligned with the three-dimensional grid to indicate the physical surfaces; and
   determining, based on the vertical columns of volumetric elements, a safety boundary to be employed by a head-mounted display system to notify a user of the head-mounted display system of the user's proximity to the physical surfaces.

2. The method of claim 1, wherein the dominant plane is located higher than a height of the user.

3. The method of claim 1, wherein:
   sensing the plurality of locations comprises sensing a first location; and
   identifying the set of grid coordinates comprises:
     defining a first volumetric element at the first location; and
     defining one of more additional first volumetric elements contiguously with the first volumetric element to form a first vertical column of volumetric elements.

4. The method of claim 3, wherein the one or more additional first volumetric elements extend vertically from the first volumetric element in a first direction away from the dominant plane.

5. The method of claim 4, wherein:
   sensing the plurality of locations comprises sensing a second location of the plurality of locations positioned vertically between the first volumetric element and the dominant plane; and
   identifying the set of grid coordinates comprises:
     translating the first volumetric element vertically to the second location; and
     translating the one or more additional first volumetric elements vertically to maintain the first vertical column.

6. The method of claim 4, wherein:
   sensing the plurality of locations comprises sensing a second location of the plurality of locations positioned vertically from, and opposite the dominant plane from, the first location;
   identifying the set of grid coordinates comprises:
     defining a second volumetric element at the second location; and
     defining one or more additional second volumetric elements contiguously with the second volumetric element to form a second vertical column of volumetric elements; and
   the one or more additional second volumetric elements extend vertically from the second volumetric element in a second direction away from the dominant plane, opposite the first direction.

7. The method of claim 6, wherein identifying the set of grid coordinates further comprises:
   determining a distance between the first volumetric element and the second volumetric element; and
   defining, based on the distance between the first volumetric element and the second volumetric element being less than a threshold value, one or more third volumetric elements between the first volumetric element and the second volumetric element to form a vertical column comprising the first vertical column, the second vertical column, and the third volumetric elements.

8. The method of claim 1, wherein:
   sensing the plurality of locations comprises sensing at least one vertical surface in the real-world environment; and
   defining the three-dimensional grid comprises aligning the three-dimensional grid based on an orientation of the vertical surface.

9. The method of claim 8, wherein the vertical surface comprises a wall.

10. The method of claim 1, wherein the head-mounted display system comprises the depth-sensing subsystem.

11. The method of claim 1, wherein:
    sensing the plurality of locations comprises sensing a horizontal surface; and
    determining the dominant plane comprises defining the dominant plane as parallel to the horizontal surface.

12. The method of claim 11, wherein the horizontal surface comprises at least one of a ceiling or a floor.

13. The method of claim 1, wherein:
    sensing the plurality of locations comprises sensing a vertical surface; and
    determining the dominant plane comprises defining the dominant plane as orthogonal to the vertical surface.

14. The method of claim 13, wherein the vertical surface comprises a wall.

15. The method of claim 1, further comprising sensing, via an inertial measurement unit, a first horizontal plane, wherein determining the dominant plane comprises defining the dominant plane as parallel to the first horizontal plane.

16. A non-transitory, tangible computer-readable storage medium having instructions stored thereon that, when executed by a processing system, cause the processing system to perform operations comprising:

receiving, from a depth-sensing subsystem, data indicating a plurality of locations in three-dimensional space corresponding to physical surfaces in a real-world environment;

determining a dominant plane within the real-world environment, wherein the dominant plane comprises a horizontal plane dividing the real-world environment into an upper region and a lower region;

defining a three-dimensional grid that is aligned with the dominant plane;

identifying, based on the plurality of locations relative to the dominant plane, a set of grid coordinates within the three-dimensional grid that are indicative of the physical surfaces;

defining, based on the set of grid coordinates, vertical columns of volumetric elements aligned with the three-dimensional grid to indicate the physical surfaces; and determining, based on the vertical columns of volumetric elements, a safety boundary to be employed by a head-mounted display system to notify a user of the head-mounted display system of the user's proximity to the physical surfaces.

17. A head-mounted display system comprising:

a display device dimensioned to be secured to a head of a user in a manner that at least partially obscures visibility of a real-world environment to the user;

a depth-sensing subsystem that senses a plurality of locations in three-dimensional space corresponding to physical surfaces in the real-world environment; and a processing system that:

determines a dominant plane within the real-world environment, wherein the dominant plane comprises a horizontal plane dividing the real-world environment into an upper region and a lower region;

defines a three-dimensional grid that is aligned with the dominant plane;

identifies, based on the plurality of locations relative to the dominant plane, a set of grid coordinates within the three-dimensional grid that are indicative of the physical surfaces;

defines, based on the set of grid coordinates, vertical columns of volumetric elements aligned with the three-dimensional grid to indicate the physical surfaces;

determines, based on the vertical columns of volumetric elements, a safety boundary associated with the physical surfaces; and presents, to the user based on the safety boundary, an indication of the user's proximity to the physical surfaces.

* * * * *